US012647931B2

(12) United States Patent
Regev et al.

(10) Patent No.: US 12,647,931 B2
(45) Date of Patent: Jun. 2, 2026

(54) LINE-OF-SIGHT STATUS

(71) Applicant: QUALCOMM Incorporated, San Diego, CA (US)

(72) Inventors: Aviv Regev, Tel Aviv (IL); Ronen Shaked, Kfar Saba (IL)

(73) Assignee: QUALCOMM Incorporated, San Diego, CA (US)

( * ) Notice: Subject to any disclaimer, the term of this patent is extended or adjusted under 35 U.S.C. 154(b) by 369 days.

(21) Appl. No.: 18/360,540

(22) Filed: Jul. 27, 2023

(65) Prior Publication Data

US 2025/0039822 A1      Jan. 30, 2025

(51) Int. Cl.
H04W 64/00      (2009.01)
H04W 24/10      (2009.01)

(52) U.S. Cl.
CPC ........... H04W 64/00 (2013.01); H04W 24/10 (2013.01)

(58) Field of Classification Search
None
See application file for complete search history.

(56) References Cited

U.S. PATENT DOCUMENTS

| | | | | | |
|---|---|---|---|---|---|
| 12,000,944 | B2 * | 6/2024 | Zhou | ..................... | G01S 5/0036 |
| 12,392,859 | B2 * | 8/2025 | Dwivedi | ............... | G01S 5/0273 |
| 2008/0032709 | A1 * | 2/2008 | Guvenc | ..................... | G01S 5/14 455/456.2 |
| 2009/0069029 | A1 * | 3/2009 | Guvenc | ..................... | G01S 5/14 455/456.1 |
| 2016/0249316 | A1 * | 8/2016 | Kudekar | ............... | G01S 5/0284 |
| 2022/0095267 | A1 * | 3/2022 | Shafin | ................... | G01S 5/0278 |
| 2023/0056394 | A1 * | 2/2023 | Priyanto | ............... | G01S 5/0036 |
| 2024/0297724 | A1 * | 9/2024 | Wang | ................. | H04B 17/3911 |
| 2025/0048311 | A1 * | 2/2025 | Ren | ........................ | H04L 5/0051 |
| 2025/0106811 | A1 * | 3/2025 | Sedin | .................... | H04W 64/00 |

OTHER PUBLICATIONS

Marangoz, M., et al., "Site Selections for Base Stations Based on a New Method", ASPRS 2014 Annual Conference, Louisville, Kentucky, Mar. 23-28, 2014, 7 Pages.
Gabriel, "What are Key Considerations for 5G Sites?" Analysys Mason Limited 2019, Sep. 2019, 30 Pages.
Fabien, J-A, "Channel Model Implementation and Application for New Radio (NR) 3GPP REL-15" Institute for Telecommunication Sciences, Aug. 15, 2018, 27 Pages.
mcafee.com, Can My Phone Be Tracked if Location Services are Off?, https://www.mcafee.com/learn/can-my-phone-be-tracked-if-location-services-are-off/#:~:text=Cell%20towers&text=Cell%20carriers%20can%20calculate%20the,data%20from%20three%20cell%20towers., accessed Jul. 27, 2023, 5 Pages.

* cited by examiner

*Primary Examiner* — Adolf Dsouza

(74) *Attorney, Agent, or Firm* — Harrity & Harrity LLP

(57)      ABSTRACT

Various aspects of the present disclosure generally relate to wireless communication. Some aspects relate to reporting of line-of-sight (LOS) status. Some aspects more specifically relate to detecting whether a user equipment (UE) is associated with a LOS status. In some examples, the UE reports location information indicating a location of the UE with the reporting of whether the UE is associated with the LOS status. In some examples a network node determines the location information. In some examples, the UE detects whether the UE is associated with the LOS status based on one or more configured thresholds. In some examples, the detection of whether the UE is associated with the LOS status is based on channel estimation at the UE.

28 Claims, 10 Drawing Sheets

Receive information indicating one or more thresholds associated with a line-of-sight (LOS) status with regard to a network node

710

Transmit, in accordance with the information indicating the one or more thresholds, a report of whether the UE is associated with the LOS status with regard to the network node

720

700

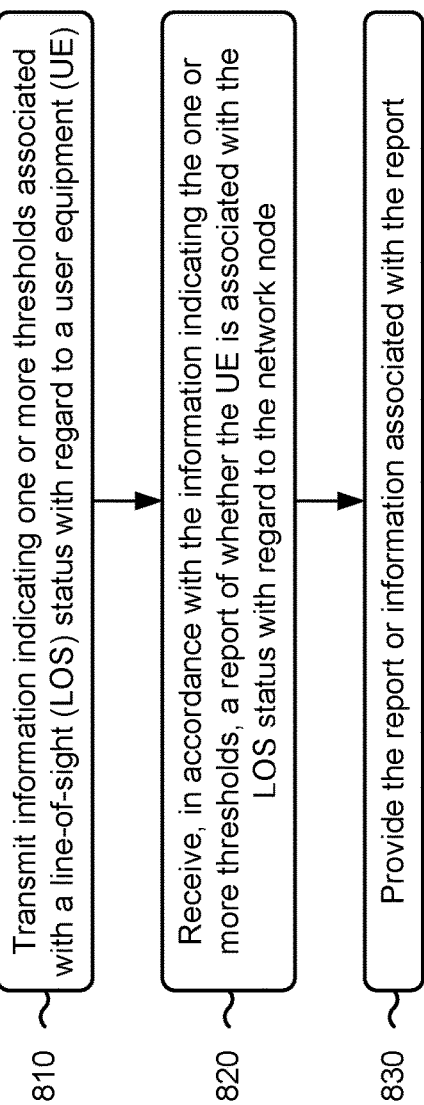

810 Transmit information indicating one or more thresholds associated with a line-of-sight (LOS) status with regard to a user equipment (UE)

820 Receive, in accordance with the information indicating the one or more thresholds, a report of whether the UE is associated with the LOS status with regard to the network node 830 Provide the report or information associated with the report

LINE-OF-SIGHT STATUS

FIELD OF THE DISCLOSURE

Aspects of the present disclosure generally relate to wireless communication and specifically relate to techniques, apparatuses, and methods for line-of-sight status indication.

BACKGROUND

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (V2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

Network nodes such as gNBs may provide access to a radio access network (RAN) via cells. "Cell," in some contexts, refers to the coverage area of a network node. Some cells may be provided via relatively narrow beams, which may in some examples operate in higher frequency ranges (for example, Frequency Range 2). Generally, beams in higher frequency ranges are more susceptible to blockage than beams in lower frequency ranges.

SUMMARY

In some aspects, a method of wireless communication performed at a user equipment (UE) includes receiving information indicating one or more thresholds associated with a line-of-sight (LOS) status with regard to a network node. The method may include transmitting, in accordance with the information indicating the one or more thresholds, a report of whether the UE is associated with the LOS status with regard to the network node.

In some aspects, a method of wireless communication performed at a network node includes transmitting information indicating one or more thresholds associated with a LOS status with regard to a UE. The method may include receiving, in accordance with the information indicating the one or more thresholds, a report of whether the UE is associated with the LOS status with regard to the network node; and providing the report or information associated with the report.

In some aspects, a non-transitory computer-readable medium storing a set of instructions for wireless communication includes one or more instructions that, when executed by one or more processors of a UE, cause the UE to receive information indicating one or more thresholds associated with a LOS status with regard to a network node. The one or more instructions, when executed by one or more processors of a UE, may cause the UE to transmit, in accordance with the information indicating the one or more thresholds, a report of whether the UE is associated with the LOS status with regard to the network node.

In some aspects, a non-transitory computer-readable medium storing a set of instructions for wireless communication includes one or more instructions that, when executed by one or more processors of a network node, cause the network node to: transmit information indicating one or more thresholds associated with a LOS status with regard to a UE. The one or more instructions, when executed by one or more processors of a network node, may cause the network node to receive, in accordance with the information indicating the one or more thresholds, a report of whether the UE is associated with the LOS status with regard to the network node. The one or more instructions, when executed by one or more processors of a network node, may cause the network node to provide the report or information associated with the report.

In some aspects, an apparatus for wireless communication includes means for receiving information indicating one or more thresholds associated with a LOS status with regard to a network node. The apparatus may include means for transmitting, in accordance with the information indicating the one or more thresholds, a report of whether the apparatus is associated with the LOS status with regard to the network node.

In some aspects, an apparatus for wireless communication includes means for transmitting information indicating one or more thresholds associated with a LOS status with regard to a UE. The apparatus may include means for receiving, in accordance with the information indicating the one or more thresholds, a report of whether the UE is associated with the LOS status with regard to the apparatus. The apparatus may include means for providing the report or information associated with the report.

In some aspects, a UE for wireless communication includes a processing system that includes one or more processors and one or more memories coupled with the one or more processors, the processing system configured to cause the UE to receive information indicating one or more thresholds associated with a LOS status with regard to a network node. The processing system may be configured to cause the UE to transmit, in accordance with the information indicating the one or more thresholds, a report of whether the UE is associated with the LOS status with regard to the network node.

In some aspects, a network node for wireless communication includes a processing system that includes one or more processors and one or more memories coupled with the one or more processors, the processing system configured to cause the network node to transmit information indicating one or more thresholds associated with a LOS status with regard to a UE. The processing system may be configured to cause the network node to receive, in accordance with the information indicating the one or more thresholds, a report of whether the UE is associated with the LOS status with regard to the network node. The processing system may be configured to cause the network node to provide the report or information associated with the report.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

FIG. 8 is a flowchart illustrating an example process performed, for example, at a network node or an apparatus of the network node that supports LOS status reporting in accordance with the present disclosure.

DETAILED DESCRIPTION

Figure 1:
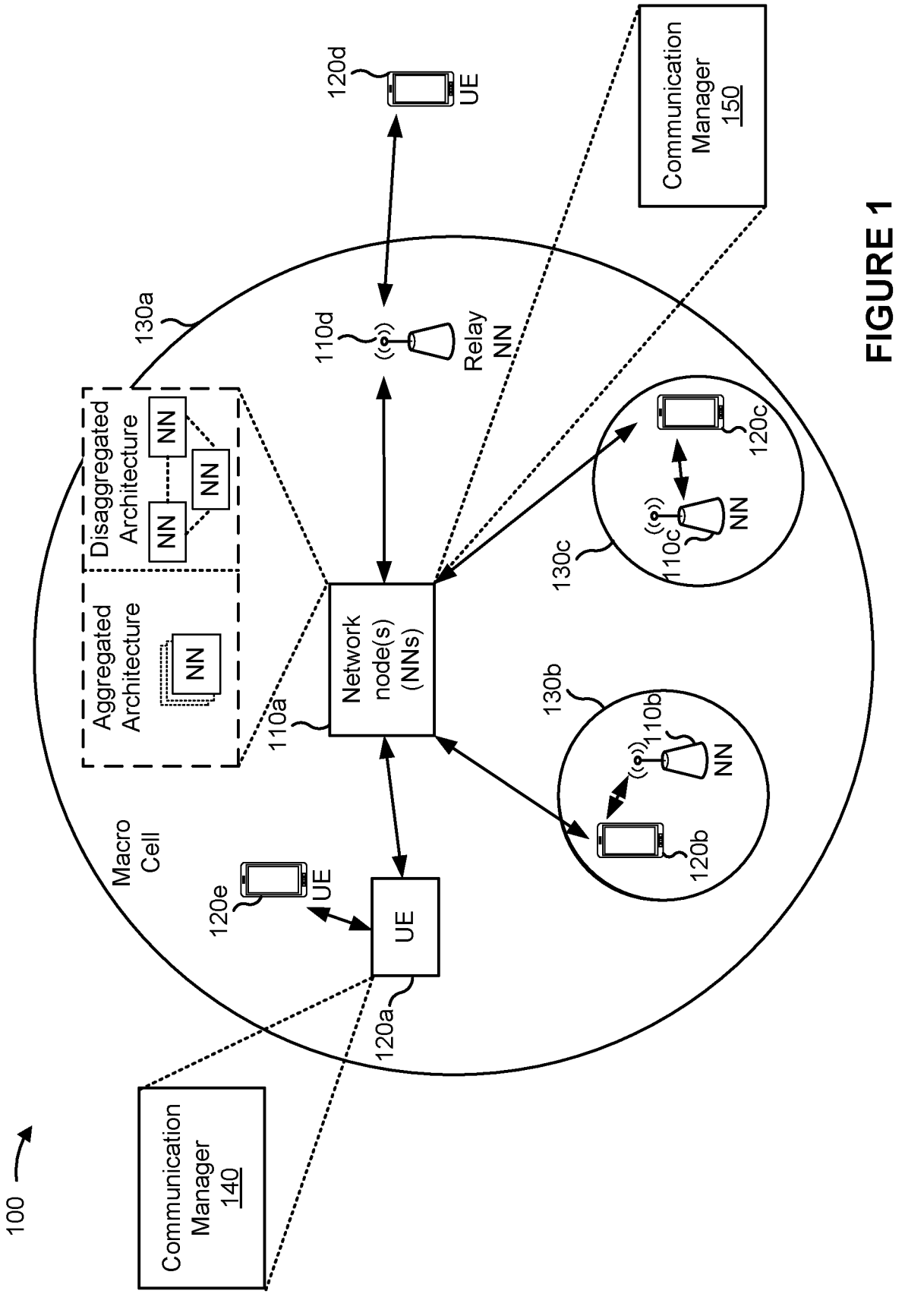
FIG. 1 is a diagram illustrating an example of a wireless communication network in accordance with the present disclosure.

Various aspects of the present disclosure are described hereinafter with reference to the accompanying drawings. However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

One aspect affecting performance of a wireless communication network is selection of network node locations to provide optimal coverage to user equipment (UEs) within the wireless communication network. The quality of received signals (such as in terms of signal to noise ratio (SNR)) becomes much better in channels that have a line-of-sight (LOS) status compared to channels that have a non-LOS (NLOS) status. This is because the SNR drops more rapidly with distance in NLOS conditions, resulting in poorer distance coverage where the conditions are NLOS as compared to LOS conditions. For example, the path loss between a UE and a network node may be proportional to $10*n*\log_{10}(\text{distance})$ [dB], where n is the path loss exponent. In LOS conditions, n may be 2. In near-LOS conditions, n may be 2.5. In NLOS conditions, n can be in a range of 3 to 5. This means the path loss changes dramatically between LOS and NLOS conditions—instead of X [dB] in LOS, the path loss can be (3 . . . 5)*X [dB]. Thus, the location of the network node is a factor in providing uninterrupted communication and satisfactory SNR. When an operator plans a deployment location, the operator may perform calculations of path loss (assuming the presence of blockages such as buildings and penetration loss due to blockages such as buildings) and may seek to place network nodes in such a way that the network nodes' coverage area achieves a satisfactory coverage, such as in terms of signal level (for example, SNR, signal-to-interference-plus-noise ratio (SINR)) throughout the coverage area.

As time passes, the placement and/or configuration of blockages may change. For example, an urban landscape may change as buildings, street furniture, or other obstructions are built or moved. This may lead to degradation of coverage of the wireless communication network. These coverage issues may be particularly relevant in dense networks, which may become prevalent with progress toward next-generation radio access technologies (RATs) such as 5G New Radio (NR) and 6G. For example, next-generation RATs may provide for an increased number and density of network nodes, involving the deployment of network nodes (for example, gNBs) not only on towers, but also at the street level. Therefore, coverage may be more prone to landscape changes that obstruct the signal relative to previous RATs such as 3G and 4G. It may be difficult for an operator or network node to identify changes in coverage. For example, manual detection of coverage changes may involve deploying a network engineer to perform testing on location. As another example, a UE undergoing radio link failure, such as due to a blockage, may report a cause for the failure, but the cause may not indicate that the failure is due to a change in LOS conditions. Thus, changing blockages may lead to degraded network performance and may be difficult and costly to detect.

Various aspects relate generally to reporting of LOS status. Some aspects more specifically relate to detecting whether a UE is associated with a LOS status. In some examples, the UE reports location information indicating a location of the UE with the reporting of whether the UE is associated with the LOS status. In some examples a network node determines the location information. In some examples, the UE detects whether the UE is associated with the LOS status based on one or more configured thresholds. In some examples, the detection of whether the UE is associated with the LOS status is based on channel estimation at the UE.

Particular aspects of the subject matter described in this disclosure can be implemented to realize one or more of the following potential advantages. By reporting whether a UE is associated with an LOS status, the UE enables a network node, operator, or core network to track occurrences of NLOS conditions, enabling reconfiguration of the wireless communication network to reduce such occurrences. By reporting the UE's location, the UE simplifies identification of locations associated with NLOS conditions, reducing processor usage and data integration overhead at the network. By determining the UE's location, the network node reduces overhead associated with LOS status reporting and enables determination of locations associated with LOS statuses even if a UE does not opt into location information sharing. Detecting the LOS status based on one or more configured thresholds, and/or based on channel estimation of the UE, enables the UE to detect the LOS status using routine channel estimation results, conserving resources of the UE relative to more sophisticated LOS detection techniques that may require additional measurements at the UE.

Multiple-access RATs have been adopted in various telecommunication standards to provide common protocols that enable different wireless communication devices to communicate on a municipal, enterprise, national, regional, or global level. For example, 5G NR, which is a RAT implementing a 5G mobile network, is part of a continuous mobile broadband evolution promulgated by the Third Generation Partnership Project (3GPP). 5G NR supports various use cases and technologies including enhanced mobile broadband (eMBB), ultra-reliable low-latency communication (URLLC), massive machine-type communication (mMTC), millimeter wave (mmWave) technology, beamforming, network slicing, edge computing, Internet of Things (IoT) connectivity and management, and network function virtualization (NFV).

As the demand for broadband access increases and as technologies supported by networks evolve, further improvements in NR may be implemented. Other RATs such as 6G may also be introduced to further advance broadband evolution. Such improvements and RATs may provide improved support for technologies such as IoT (including passive IoT devices), reduced capability (RedCap) UEs, industrial connectivity, mmWave expansion, licensed and unlicensed spectrum access, non-terrestrial network (NTN) deployment, sidelink and other device-to-device direct communication technologies, massive multiple-input multiple-output (MIMO), disaggregated network architectures and network topology expansions, multiple-subscriber implementations, high-precision positioning, radio frequency (RF) sensing, frequency band expansion, advanced duplex, small cell deployment, and/or overlapping spectrum use, among other examples. These technologies may support use cases such as wireless backhaul, artificial intelligence or machine learning (AI/ML), extended reality (XR) and metaverse applications, meta services for supporting vehicle connectivity, universal coverage using non-terrestrial and/or aerial platforms, holographic and mixed reality communication, autonomous and collaborative robots, vehicle platooning and cooperative maneuvering, sensing networks, a human-brain interface, digital twins, gesture monitoring, and asset management, among other examples. The methods, operations, apparatuses, and techniques described herein may enable one or more of the technologies and/or support one or more of the use cases described with regard to 5G NR, 6G, or other RATs.

FIG. 1 is a diagram illustrating an example of a wireless communication network 100 in accordance with the present disclosure. The wireless communication network 100 may be or may include elements of a 5G (or NR) network or a 6G network, among other examples. The wireless communication network 100 may include multiple network nodes 110 (also referred to as network entities), shown as a network node (NN) 110*a*, a network node 110*b*, a network node 110*c*, and a network node 110*d*. The network nodes 110 may support communications with multiple UEs 120, shown as a UE 120*a*, a UE 120*b*, a UE 120*c*, a UE 120*d*, and a UE 120*e*.

A network node 110 may include one or more devices or systems that enable communication between a UE 120 and one or more components of the wireless communication network 100. A network node 110 may be, may include, or may be referred to as, an NR network node, a 5G network node, a 6G network node, a Node B, an eNB (for example, in 4G), a gNB (for example, in 5G), an access point (AP), a transmission reception point (TRP), a mobility element of a network, a core network node, a network element, a network equipment, and/or another type of device or devices included in a radio access network (RAN).

A network node 110 may be implemented as a single physical node (for example, a single physical structure) or may be implemented as two or more physical nodes (for example, two or more distinct physical structures). For example, a network node 110 may be a device or system that implements part of a radio protocol stack, a device or system that implements a full protocol stack (such as a full gNB protocol stack), or a collection of devices or systems that collectively implement the full protocol stack. For example, and as shown, a network node 110 may be an aggregated network node, meaning that the network node 110 may implement a full radio protocol stack that is physically and logically integrated within a single node (for example, a single physical structure) in the wireless communication network 100. For example, an aggregated network node 110 may consist of a single standalone base station or a single TRP that uses a full radio protocol stack to enable or facilitate communication between a UE 120 and a core network of the wireless communication network 100.

Alternatively, and as also shown, a network node 110 may be a disaggregated network node (sometimes referred to as a disaggregated base station), meaning that the network node 110 may use a protocol stack that is physically distributed and/or logically distributed among two or more nodes in the same geographic location or in different geographic locations. In some deployments, disaggregated network nodes 110 may be used in an integrated access and backhaul (IAB) network, in an open radio access network (O-RAN), such as the network configuration sponsored by the O-RAN Alliance, or in a virtualized radio access network (vRAN), also known as a cloud radio access network (C-RAN), to facilitate scaling of communication systems by separating base station functionality into multiple units that can be individually deployed.

The network nodes 110 of the wireless communication network 100 may include one or more central units (CUs), one or more distributed units (DUs), and/or one or more radio units (RUs). A CU may host one or more higher layer control functions, such as radio resource control (RRC) functions, packet data convergence protocol (PDCP) functions, and/or service data adaptation protocol (SDAP) functions, among other examples. A DU may host one or more of a radio link control (RLC) layer, a medium access control (MAC) layer, and/or one or more high physical (PHY) layers depending, at least in part, on a functional split, such as a functional split defined by the Third Generation Partnership Project (3GPP). In some examples, a DU also may host one or more low PHY layer functions, such as a fast Fourier transform (FFT), an inverse FFT (iFFT), beamforming, physical random access channel (PRACH) extraction and filtering, and/or scheduling of resources for one or more UEs 120, among other examples. An RU may host RF processing functions or low PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 120.

In some aspects, a network node 110 may include a combination of one or more CUs, one or more DUs, and/or one or more RUs. Additionally or alternatively, a network node 110 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink channels may include one or more control channels and one or more data channels. A downlink control channel may be used to transmit downlink control information (for example, scheduling information, reference signals, and/or configuration information) from a network node 110 to a UE 120. A downlink data channel may be used to transmit downlink data (for example, user data associated with a UE 120) from a network node 110 to a UE 120. Downlink control channels may include one or more physical downlink control channels (PDCCHs), and downlink data channels may include one or more physical downlink shared channels (PDSCHs). Uplink channels may similarly include one or more control channels and one or more data channels. An uplink control channel may be used to transmit uplink control information (for example, reference signals and/or feedback corresponding to one or more downlink transmissions) from a UE 120 to a network node 110. An uplink data channel may be used to transmit uplink data (for example, user data associated with a UE 120) from a UE 120 to a network node 110. Uplink control channels may include one or more physical uplink control channels (PUCCHs), and uplink data channels may include one or more physical uplink shared channels (PUSCHs). The downlink and the uplink may each include a set of resources on which the network node 110 and the UE 120 may communicate.

In some examples, the UE 120 and the network node 110 may perform MIMO communication. "MIMO" generally refers to transmitting or receiving multiple signals (such as multiple layers or multiple data streams) simultaneously over the same time and frequency resources. MIMO techniques generally exploit multipath propagation. MIMO may be implemented using various spatial processing or spatial multiplexing operations. In some examples, MIMO may support simultaneous transmission to multiple receivers, referred to as multi-user MIMO (MU-MIMO). Some radio access technologies (RATs) may employ advanced MIMO techniques, such as mTRP operation (including redundant transmission or reception on multiple TRPs), reciprocity in the time domain or the frequency domain, single-frequency-network (SFN) transmission, or non-coherent joint transmission (NC-JT). Furthermore, in a wireless local area network (WLAN), one or more wireless communication device that include multiple antennas may support spatial multiplexing, which may be used to increase the spectral efficiency and the resultant throughput of a transmission. To implement spatial multiplexing, the transmitting device divides the data stream into a quantity of separate, independent spatial streams that are then separately encoded and transmitted in parallel via the multiple transmit antennas.

In some examples, any network node 110 that relays communications may be referred to as a relay network node, a relay station, or simply as a relay. A relay may receive a transmission of a communication from an upstream station (for example, another network node 110 or a UE 120) and transmit the communication to a downstream station (for example, a UE 120 or another network node 110). In this case, the wireless communication network 100 may include or be referred to as a "multi-hop network." In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. Additionally or alternatively, a UE 120 may be or may operate as a relay station that can relay transmissions to or from other UEs 120. A UE 120 that relays communications may be referred to as a UE relay or a relay UE, among other examples.

In some examples, a relay network node 110 may include an electromagnetic radiation reflective component that can be used to relay (for example, reflect) signals from a first other network node 110 to a second other network node 110 or a UE 120. Such a relay network node 110 can include, for example, a radio frequency reflection array configured to perform radio frequency reflection functions. The electromagnetic radiation reflective array can be, for example, a reconfigurable intelligent surface (RIS) (which also can be referred to as an intelligent reflective surface (IRS)).

The UEs 120 may be physically dispersed throughout the wireless communication network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an extended reality (XR) device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 120 may include or may be included in a housing that houses components associated with the UE 120, such as one or more processor components and/or one or more memory components. One or more of the processor components may be coupled with one or more of the memory components and/or other components. For example, the processor components (for example, one or more processors) and the memory components (for example, one or more memories) may be operatively coupled, communicatively coupled, electronically coupled, or electrically coupled with one another. In some examples, a UE 120 include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs) or digital signal processors (DSPs)), processing blocks, application-specific integrated circuits (ASIC), programmable logic devices (PLDs)

(such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions. The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi modem or a cellular (for example, 3GPP 4G Long Term Evolution (LTE), 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers.

Some UEs 120 may be considered machine-type communication (MTC) or evolved or enhanced machine-type communication (eMTC) UEs (or further enhanced eMTC (feMTC), or enhanced feMTC (efeMTC), or further evolutions thereof, all of which may be simply referred to as "MTC"). An MTC UE may be, may include, or may be included in or coupled with a robot, an unmanned aerial vehicle, a remote device, a sensor, a meter, a monitor, and/or a location tag. Some UEs 120 may be considered IoT devices and/or may be implemented as NB-IoT (narrowband IoT) devices. An IoT UE or NB-IoT device may be, may include, or may be included in or coupled with an industrial machine, an appliance, a refrigerator, a doorbell camera device, a home automation device, and/or a light fixture, among other examples. Some UEs 120 may be considered Customer Premises Equipment, which may include telecommunications devices that are installed at a customer location (such as a home or office) to enable access to a service provider's network (such as included in or in communication with the wireless communication network 100).

Downlink and uplink resources may include time domain resources (frames, subframes, slots, and/or symbols), frequency domain resources (frequency bands, frequency carriers, subcarriers, resource blocks, and/or resource elements), and/or spatial domain resources (particular transmit directions and/or beam parameters). Frequency domain resources of some bands may be subdivided into bandwidth parts (BWPs). A BWP may be a continuous block of frequency domain resources (for example, a continuous block of resource blocks) that are allocated for one or more UEs 120. A UE 120 may be configured with both an uplink BWP and a downlink BWP (where the uplink BWP and the downlink BWP may be the same BWP or different BWPs). A BWP may be dynamically configured (for example, by a network node 110 transmitting a downlink control information (DCI) configuration to the one or more UEs 120) and/or reconfigured, which means that a BWP can be adjusted in real-time (or near-real-time) based on changing network conditions in the wireless communication network 100 and/or based on the specific requirements of the one or more UEs 120. This enables more efficient use of the available frequency domain resources in the wireless communication network 100 because fewer frequency domain resources may be allocated to a BWP for a UE 120 (which may reduce the quantity of frequency domain resources that a UE 120 is required to monitor), leaving more frequency domain resources to be spread across multiple UEs 120. Thus, BWPs may also assist in the implementation of lower-capability UEs 120 by facilitating the configuration of smaller bandwidths for communication by such UEs 120.

Some network nodes 110 (for example, a base station, an RU, or a TRP) may provide communication coverage for a particular geographic area. In the 3GPP, the term "cell" can refer to a coverage area of a network node 110 or to a network node 110 itself, depending on the context in which the term is used. A network node 110 may support one or multiple (for example, three) cells. In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In some examples, a cell may not necessarily be stationary. For example, the geographic area of the cell may move according to the location of an associated mobile network node 110 (for example, a train, a satellite base station, an unmanned aerial vehicle, or a non-terrestrial network (NTN) network node).

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. In the example shown in FIG. 1, the network node 110a may be a macro network node for a macro cell 130a, the network node 110b may be a pico network node for a pico cell 130b, and the network node 110c may be a femto network node for a femto cell 130c. Various different types of network nodes 110 may generally transmit at different power levels, serve different coverage areas, and/or have different impacts on interference in the wireless communication network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts).

The network nodes 110 and the UEs 120 of the wireless communication network 100 may communicate using the electromagnetic spectrum, which may be subdivided by frequency or wavelength into various classes, bands, carriers, and/or channels. For example, devices of the wireless communication network 100 may communicate using one or more operating bands. In some aspects, multiple wireless communication networks 100 may be deployed in a given geographic area. Each wireless communication network 100 may support a particular RAT (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHz), FR2 (24.25 GHz through 52.6 GHz), FR3 (7.125 GHz through 24.25 GHz), FR4a or FR4-1 (52.6 GHz through 71 GHz), FR4 (52.6 GHz through 114.25 GHz), and FR5 (114.25 GHz through 300 GHz). Although a portion of FR1 is greater than 6 GHz, FR1 is often referred to (interchangeably) as a "Sub-6 GHz" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHz," if used herein, may broadly refer to frequencies that are less than 6 GHz, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHz. For example, each of FR4a, FR4-1, FR4, and FR5 falls within the EHF band. In some examples, the wireless communication network 100 may implement dynamic spectrum sharing (DSS), in which multiple RATs (for example, 4G/LTE and 5G/NR) are implemented with dynamic bandwidth allocation (for example, based on user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

In some aspects, the UE 120 may include a communication manager 140. As described in more detail elsewhere herein, the communication manager 140 may receive information indicating one or more thresholds associated with a line-of-sight (LOS) status with regard to a network node; and transmit, in accordance with the information indicating the one or more thresholds, a report of whether the UE is associated with the LOS status with regard to the network node. Additionally, or alternatively, the communication manager 140 may perform one or more other operations described herein.

In some aspects, the network node 110 may include a communication manager 150. As described in more detail elsewhere herein, the communication manager 150 may transmit information indicating one or more thresholds associated with a LOS status with regard to a UE; receive, in accordance with the information indicating the one or more thresholds, a report of whether the UE is associated with the LOS status with regard to the network node; and provide the report or information associated with the report. Additionally, or alternatively, the communication manager 150 may perform one or more other operations described herein.

Figure 2:
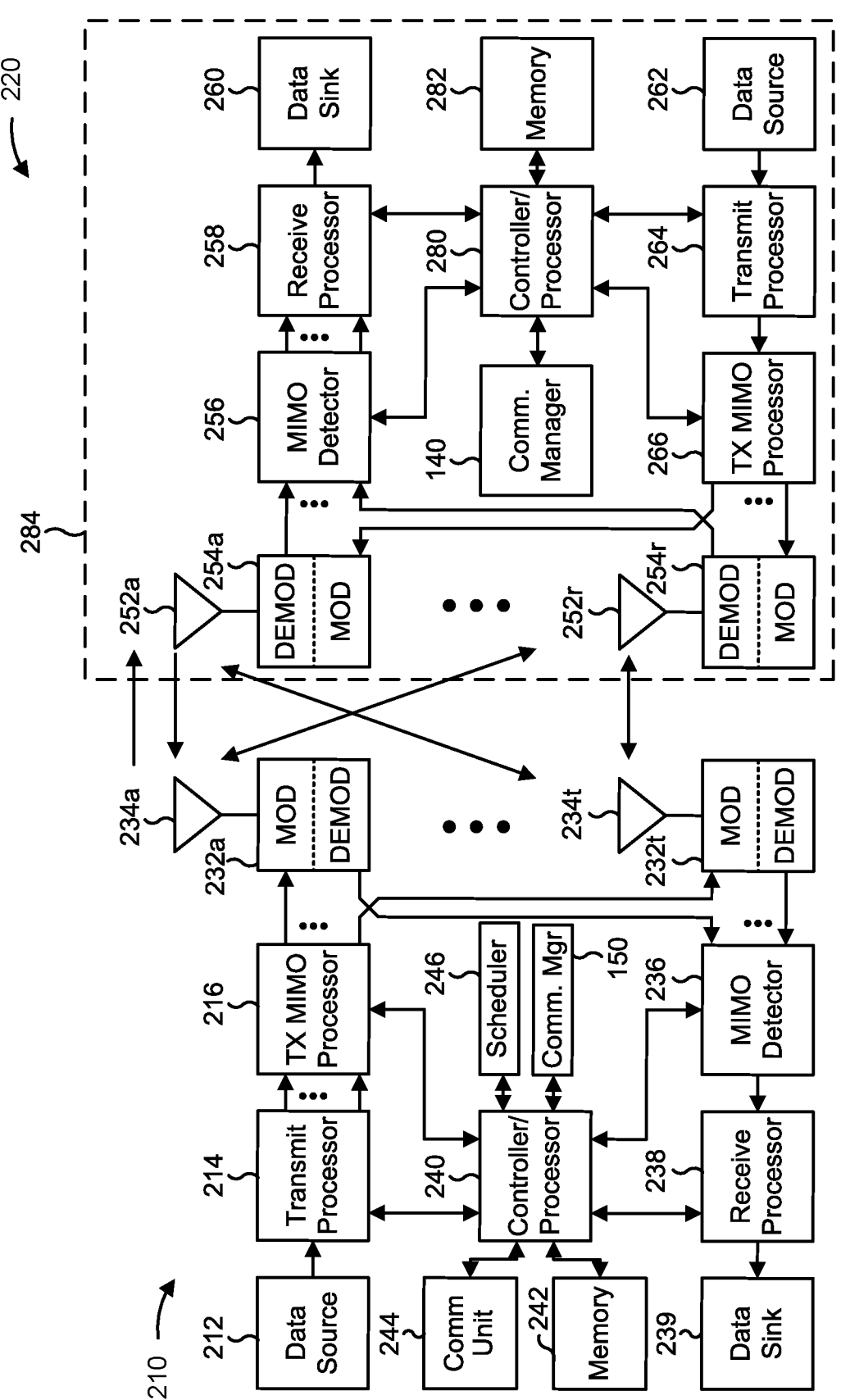
FIG. 2 is a diagram illustrating an example network node in communication with an example user equipment (UE) in a wireless network in accordance with the present disclosure.

FIG. 2 is a diagram illustrating an example network node 210 in communication with an example UE 220 in a wireless network in accordance with the present disclosure. The network node 210 of FIG. 2 may be an example of the network node 110 described with reference to FIG. 1. Similarly, the UE 220 may be an example of the UE 120 described with reference to FIG. 1.

As shown in FIG. 2, the network node 210 may include a data source 212, a transmit processor 214, a transmit (TX) multiple-input multiple-output (MIMO) processor 216, a set of modems 232 (shown as 232a through 232t, where t≥1), a set of antennas 234 (shown as 234a through 234v, where v≥1), a MIMO detector 236, a receive processor 238, a data sink 239, a controller/processor 240, a memory 242, a communication unit 244, a scheduler 246, and/or a communication manager 150 among other examples. In some configurations, one or a combination of the antenna(s) 234, the modem(s) 232, the MIMO detector 236, the receive processor 238, the transmit processor 214, and/or the TX MIMO processor 216 may be included in a transceiver of the network node 210. The transceiver may be under control of and used by a processor, such as the controller/processor 240, and in some aspects in conjunction with processor-readable code stored in the memory 242, to perform aspects of the methods, processes, and/or operations described herein. In some aspects, the network node 210 may include one or more interfaces, communication components, and/or other components that facilitate communication with the UE 220 or another network node.

The terms "processor," "controller," or "controller/processor" may refer to one or more controllers and/or one or more processors. For example, reference to "a/the processor," "a/the controller/processor," or the like (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 210 may include transmit processor 214, TX MIMO processor 216, MIMO detector 236, receive processor 238, and/or controller/processor 240. Similarly, one or more processors of the UE 220 may include MIMO detector 256, receive processor 258, transmit processor 264, TX MIMO processor 266, and/or controller/processor 280.

In some aspects, a single processor may perform all of the operations described as being performed by the one or more processors. In some aspects, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

For downlink communication from the network node 210 to the UE 220, the transmit processor 214 may receive data ("downlink data") intended for the UE 220 (or a set of UEs that includes the UE 220) from the data source 212 (such as a data pipeline or a data queue). In some examples, the transmit processor 214 may select one or more MCSs for the UE 220 in accordance with one or more channel quality indicators (CQIs) received from the UE 220. The network node 210 may process the data (for example, including encoding the data) for transmission to the UE 220 on a downlink in accordance with the MCS(s) selected for the UE 220 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a demodulation reference signal (DMRS), or a channel state information (CSI) reference signal (CSI-RS)) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for orthogonal frequency division multiplexing ((OFDM)) to obtain an output sample stream. Each modem 232 may further use the respective modulator component to process (for example, convert to analog, amplify, filter, and/or upconvert) the output sample stream to obtain a time domain downlink signal. The modems 232a through 232t may together transmit a set of downlink signals (for example, T downlink signals) via the corresponding set of antennas 234.

A downlink signal may include a DCI communication, a MAC control element (MAC-CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless communication network 100. A data stream (for example, from the data source 212) may be encoded into multiple TBs for transmission over the air interface. The quantity of TBs used to carry the data associated with a particular data stream may be associated with a TB size common to the multiple TBs. The TB size may be based on or otherwise associated with radio channel conditions of the air interface, the MCS used for encoding the data, the downlink resources allocated for transmitting the data, and/or another parameter. In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

For uplink communication from the UE 220 to the network node 210, uplink signals from the UE 220 may be received by an antenna 234, may be processed by a modem 232 (for example, a demodulator component, shown as DEMOD, of a modem 232), may be detected by the MIMO detector 236 (for example, a receive (Rx) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

The network node 210 may use the scheduler 246 to schedule one or more UEs 220 for downlink or uplink communications. In some aspects, the scheduler 246 may use DCI to dynamically schedule DL transmissions to the UE 220 and/or UL transmissions from the UE 220. In some examples, the scheduler 246 may allocate recurring time domain resources and/or frequency domain resources that the UE 220 may use to transmit and/or receive communications using an RRC configuration (for example, a semi-static configuration), for example, to perform semi-persistent scheduling (SPS) or to configure a configured grant (CG) for the UE 220.

One or more of the transmit processor 214, the TX MIMO processor 216, the modem 232, the antenna 234, the MIMO detector 236, the receive processor 238, and/or the controller/processor 240 may be included in an RF chain of the network node 210. An RF chain may include filters, mixers, oscillators, amplifiers, analog-to-digital converters (ADCs), and/or other devices that convert between an analog signal (such as for transmission or reception via an air interface) and a digital signal (such as for processing by one or more processors of the network node 210). In some aspects, the RF chain may be or may be included in a transceiver of the network node 210.

In some examples, the network node 210 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 210 may use the communication unit 244 to transmit and/or receive data associated with the UE 220 or to perform network control signaling, among other examples. The communication unit 244 may include a transceiver and/or an interface, such as a network interface.

The UE 220 may include a set of antennas 252 (shown as antennas 252a through 252r, where r≥1), a set of modems 254 (shown as modems 254a through 254u, where u≥1), a MIMO detector 256, a receive processor 258, a data sink 260, a data source 262, a transmit processor 264, a TX MIMO processor 266, a controller/processor 280, a memory 282, and/or a communication manager 140, among other examples. One or more of the components of the UE 220 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 220. The transceiver may be under control of and used by a processor, such as the controller/processor 280, and in some aspects in conjunction with processor-readable code stored in the memory 282, to perform aspects of the methods, processes, or operations described herein. In some aspects, the UE 220 may include another interface, another communication component, and/or another component that facilitates communication with the network node 210 and/or another UE 220.

For downlink communication from the network node 210 to the UE 220, the set of antennas 252 may receive the downlink communications or signals from the network node 210 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 220 to the data sink 260 (such as a data pipeline, a data queue, and/or an application executed on the UE 220), and may provide decoded control information and system information to the controller/processor 280.

For uplink communication from the UE 220 to the network node 210, the transmit processor 264 may receive and process data ("uplink data") from a data source 262 (such as a data pipeline, a data queue, and/or an application executed on the UE 220) and control information from the controller/processor 280. The control information may include one or more parameters, feedback, one or more signal measurements, and/or other types of control information. In some aspects, the receive processor 258 and/or the controller/processor 280 may determine, for a received signal (such as received from the network node 210 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a CQI parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 220 by the network node 210.

The transmit processor 264 may generate reference symbols for one or more reference signals, such as an uplink DMRS, an uplink sounding reference signal, and/or another type of reference signal. The symbols from the transmit processor 264 may be precoded by the TX MIMO processor 266, if applicable, and further processed by the set of modems 254 (for example, for DFT-s-OFDM or CP-OFDM). The TX MIMO processor 266 may perform spatial processing (for example, precoding) on the data symbols, the control symbols, the overhead symbols, and/or the reference symbols, if applicable, and may provide a set of output symbol streams (for example, R output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems 254*a* through 254*r* may transmit a set of uplink signals (for example, R uplink signals) via the corresponding set of antennas 252. An uplink signal may include an uplink control information (UCI) communication, a MAC-CE communication, an RRC communication, or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 220) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. "Beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, width, and/or presence of side lobes) and/or the direction of a beam (such as an angle of the beam relative to a surface of an antenna array) can be dynamically controlled by modifying the phase shifts, phase offsets, and/or amplitudes of the multiple signals relative to each other.

Different UEs 220 or network nodes 110 may include different numbers of antenna elements. For example, a UE 220 may include a single antenna element, two antenna elements, four antenna elements, eight antenna elements, or a different number of antenna elements. As another example, a network node 210 may include eight antenna elements, 24 antenna elements, 64 antenna elements, 128 antenna elements, or a different number of antenna elements. Generally, a larger number of antenna elements may provide increased control over parameters for beam generation relative to a smaller number of antenna elements, whereas a smaller number of antenna elements may be less complex to implement and may use less power than a larger number of antenna elements. Multiple antenna elements may support multiple-layer transmission, in which a first layer of a communication (which may include a first data stream) and a second layer of a communication (which may include a second data stream) are transmitted using the same time and frequency resources with spatial multiplexing.

Figure 3:
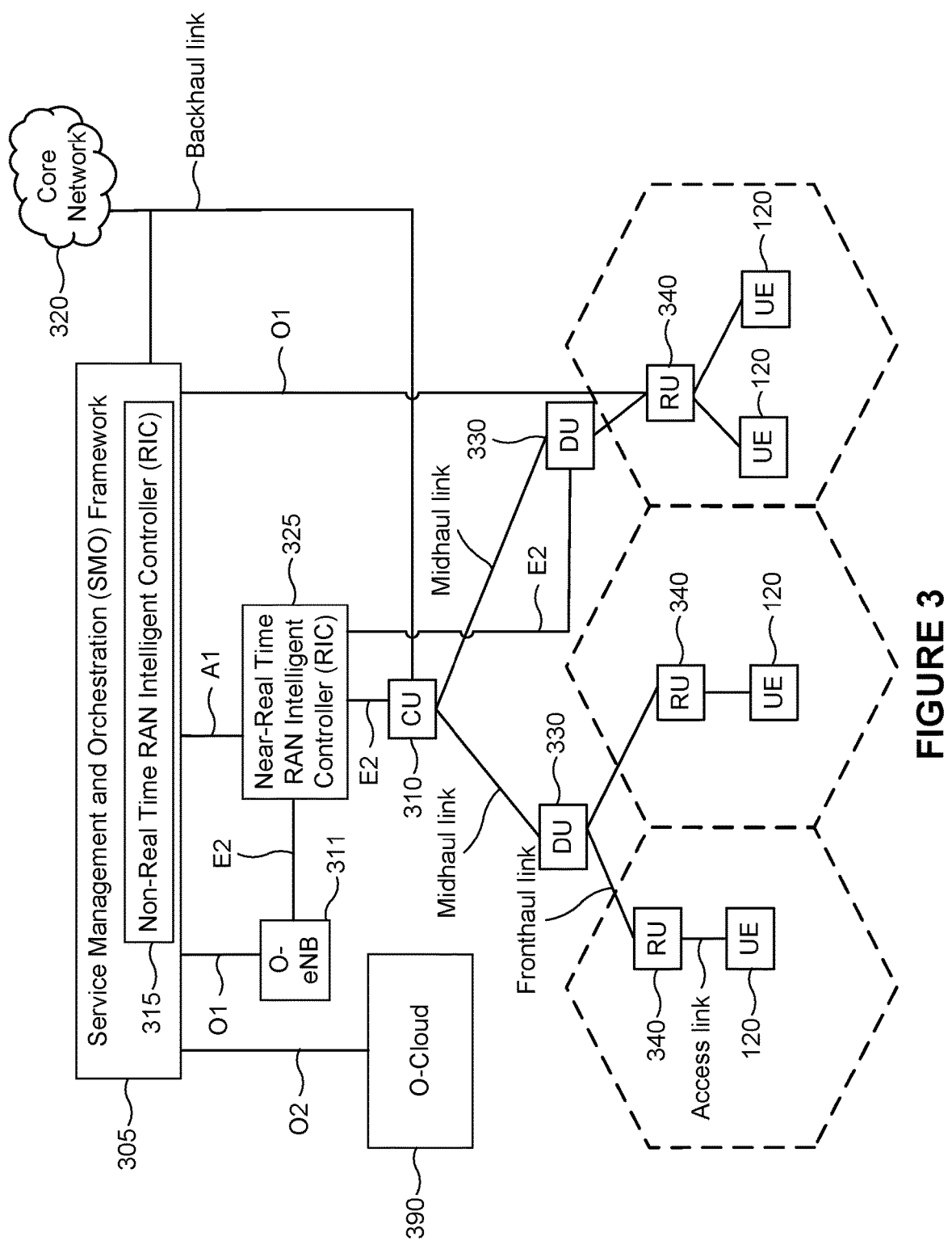
FIG. 3 is a diagram illustrating an example disaggregated base station architecture in accordance with the present disclosure.

FIG. 3 is a diagram illustrating an example disaggregated base station architecture 300 in accordance with the present disclosure. One or more components of the example disaggregated base station architecture 300 may be, may include, or may be included in one or more network nodes (such one or more network nodes 110 or one or more network nodes 210). The disaggregated base station architecture 300 may include a CU 310 that can communicate directly with a core network 320 via a backhaul link, or that can communicate indirectly with the core network 320 via one or more disaggregated control units, such as a Near-RT RIC 325 (for example, via an E2 link) and/or a Non-RT RIC 315 associated with a Service Management and Orchestration (SMO) Framework 305. The CU 310 may communicate with one or more DUs 330 via respective midhaul links, such as via F1 interfaces. Each of the DUs 330 may communicate with one or more RUs 340 via respective fronthaul links. Each of the RUs 340 may communicate with one or more UEs 120 via respective RF access links. In some deployments, a UE 120 may be simultaneously served by multiple RUs 340.

Each of the components of the disaggregated base station architecture 300, including the CUs 310, the DUs 330, the RUs 340, the Near-RT RICs 325, the Non-RT RICs 315, and the SMO Framework 305, may include one or more interfaces or may be coupled with one or more interfaces for receiving or transmitting signals, such as data or information, via a wired or wireless transmission medium.

In some aspects, the CU 310 may be logically split into one or more CU-UP units and one or more CU-CP units. A CU-UP unit may communicate bidirectionally with a CU-CP unit via an interface, such as the E1 interface when implemented in an O-RAN configuration. The CU 310 may be deployed to communicate with one or more DUs 330, as necessary, for network control and signaling. Each DU 330 may correspond to a logical unit that includes one or more base station functions to control the operation of one or more RUs 340. For example, a DU 330 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 330, or for communicating signals with the control functions hosted by the CU 310. Each RU 340 may implement lower layer functionality. In some aspects, real-time and non-real-time aspects of control and user plane communication with the RU(s) 340 may be controlled by the corresponding DU 330.

The SMO Framework 305 may support RAN deployment and provisioning of non-virtualized and virtualized network elements. For non-virtualized network elements, the SMO Framework 305 may support the deployment of dedicated physical resources for RAN coverage requirements, which may be managed via an operations and maintenance interface, such as an O1 interface. For virtualized network elements, the SMO Framework 305 may interact with a cloud computing platform (such as an open cloud (O-Cloud) platform 390) to perform network element life cycle management (such as to instantiate virtualized network elements) via a cloud computing platform interface, such as an O2 interface. A virtualized network element may include, but is not limited to, a CU 310, a DU 330, an RU 340, a non-RT RIC 315, and/or a Near-RT RIC 325. In some aspects, the SMO Framework 305 may communicate with a hardware aspect of a 4G RAN, a 5G NR RAN, and/or a 6G RAN, such as an open eNB (O-eNB) 311, via an O1 interface. Additionally or alternatively, the SMO Framework 305 may communicate directly with each of one or more RUs 340 via a respective O1 interface. In some deployments, this configuration can enable each DU 330 and the CU 310 to be implemented in a cloud-based RAN architecture, such as a vRAN architecture.

The Non-RT RIC 315 may include or may implement a logical function that enables non-real-time control and optimization of RAN elements and resources, artificial intelligence and/or machine learning (AI/ML) workflows including model training and updates, and/or policy-based guidance of applications and/or features in the Near-RT RIC 325. The Non-RT RIC 315 may be coupled to or may communicate with (such as via an A1 interface) the Near-RT RIC 325. The Near-RT RIC 325 may include or may implement a logical function that enables near-real-time control and optimization of RAN elements and resources via data collection and actions via an interface (such as via an E2 interface) connecting one or more CUs 310, one or more DUs 330, and/or an O-eNB with the Near-RT RIC 325.

In some aspects, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may tune RAN behavior or performance. For example, the Non-RT RIC 315 may monitor long-term trends and patterns for performance and may employ AI/ML models to perform corrective actions via the SMO Framework 305 (such as reconfiguration via an O1 interface) or via creation of RAN management policies (such as A1 interface policies).

The network node 110, the controller/processor 240 of the network node 210, the UE 120, the controller/processor 280 of the UE 220, the CU 310, the DU 330, the RU 340, or any other component(s) of FIG. 1, 2, or 3 may implement one or more techniques or perform one or more operations associated with line-of-sight (LOS) status indication, as described in more detail elsewhere herein. For example, the controller/processor 240 of the network node 210, the controller/processor 280 of the UE 220, any other component(s) of FIG. 2, the CU 310, the DU 330, or the RU 340 may perform or direct operations of, for example, process 700 of FIG. 7, process 800 of FIG. 8, or other processes as described herein (alone or in conjunction with one or more other processors). The memory 242 may store data and program codes for the network node 110, the network node 210, the CU 310, the DU 330, or the RU 340. The memory 282 may store data and program codes for the UE 120 or the UE 220. In some examples, the memory 242 or the memory 282 may include a non-transitory computer-readable medium storing a set of instructions (for example, code or program code) for wireless communication. The memory 242 may include one or more memories, such as a single memory or multiple different memories (of the same type or of different types). The memory 282 may include one or more memories, such as a single memory or multiple different memories (of the same type or of different types). For example, the set of instructions, when executed (for example, directly, or after compiling, converting, or interpreting) by one or more processors of the network node 210, the UE 220, the CU 310, the DU 330, or the RU 340, may cause the one or more processors to perform process 700 of FIG. 7, process 800 of FIG. 8, or other processes as described herein. In some examples, executing instructions may include running the instructions, converting the instructions, compiling the instructions, and/or interpreting the instructions, among other examples.

In some aspects, the UE includes means for receiving information indicating one or more thresholds associated with a LOS status with regard to a network node; and/or means for transmitting, in accordance with the information indicating the one or more thresholds, a report of whether the UE is associated with the LOS status with regard to the network node. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node includes means for transmitting information indicating one or more thresholds associated with a line-of-sight (LOS) status with regard to a user equipment (UE); means for receiving, in accordance with the information indicating the one or more thresholds, a report of whether the UE is associated with the LOS status with regard to the network node; and/or means for providing the report or information associated with the report. The means for the network node to perform operations described herein may include, for example, one or more of communication manager 150, transmit processor 214, TX MIMO processor 216, modem 232, antenna 234, MIMO detector 236, receive processor 238, controller/processor 240, memory 242, or scheduler 246.

Figure 4:
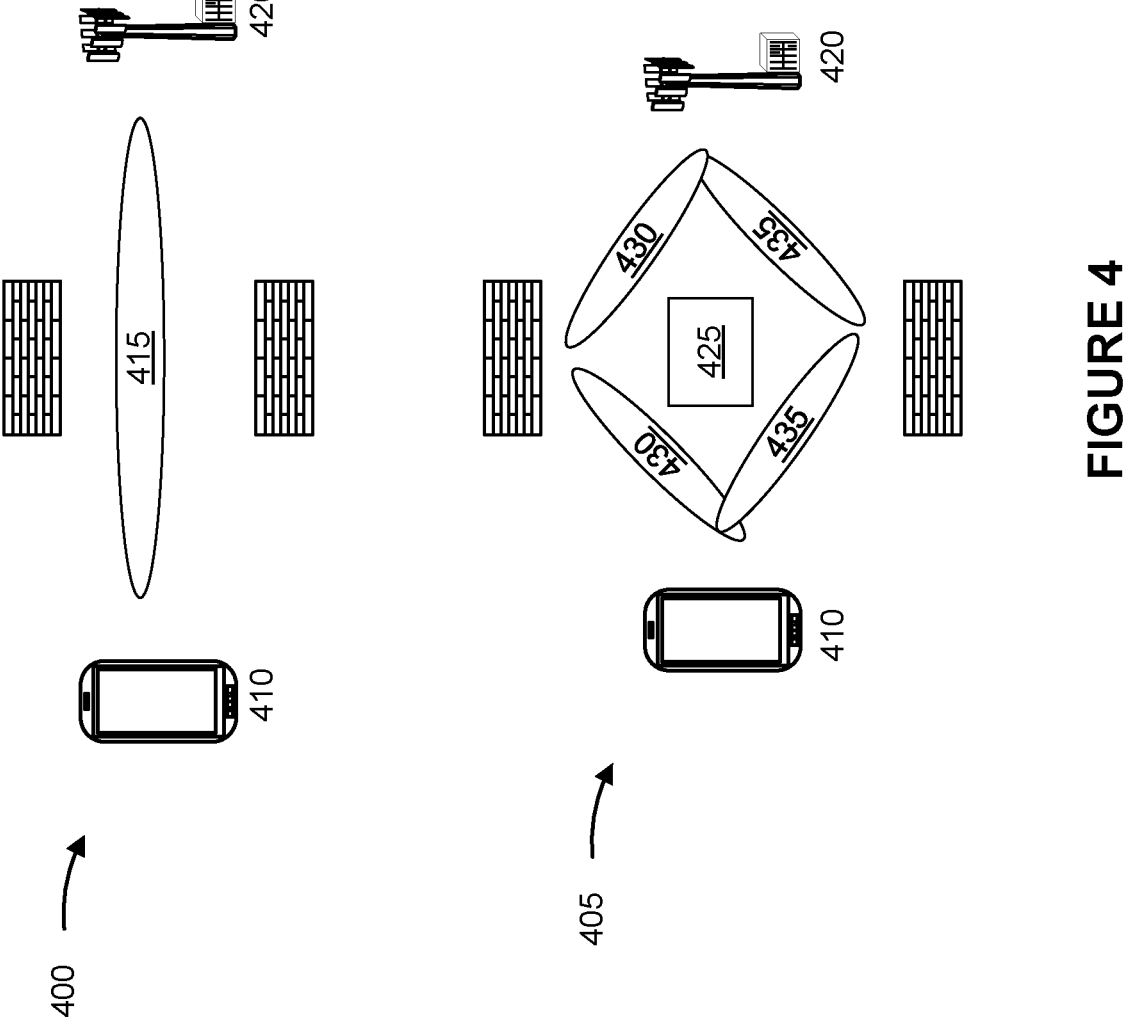
FIG. 4 is a diagram illustrating an example of an LOS status and an example of a non-LOS (NLOS) status in accordance with the present disclosure.

FIG. 4 is a diagram illustrating an example 400 of an LOS status and an example 405 of an NLOS status in accordance with the present disclosure. An LOS status indicates that a UE 410 (such as UE 120) is associated with an unobstructed channel 415 to a network node 420 (such as network node 110). The UE 410 may also receive communications via NLOS paths reflecting off nearby obstructions or other surfaces. A UE with an LOS status with regard to the network node 420 may be referred to as being within an LOS of the network node 420. An NLOS status may indicate that the UE 410 is associated with an obstructed channel to the network node 420, such as due to a blockage 425. Thus, the UE 410 may receive communications from the network node 420 primarily via NLOS paths 430 and 435, such as via reflection of the signal.

One aspect affecting performance of a wireless communication network is selection of network node locations to provide optimal coverage to UEs within the wireless communication network. The quality of received signals (such as in terms of signal to noise ratio (SNR)) becomes much better in channels that have an LOS status compared to channels that have an NLOS status. This is because the SNR drops more rapidly with distance in NLOS conditions, resulting in poorer distance coverage where the conditions are NLOS as compared to LOS conditions. For example, the path loss between a UE and a network node may be proportional to $10a*n*\log_{10}(\text{distance})$ [dB], where n is the path loss exponent. In LOS conditions, n may be 2. In near-LOS conditions, n may be 2.5. In NLOS conditions, n can be in a range of 3 to 5. This means the path loss changes dramatically between LOS and NLOS conditions—instead of X [dB] in LOS, the path loss can be (3 . . . 5)*X [dB]. Thus, the location of the network node is a factor in providing uninterrupted communication and satisfactory SNR. When an operator plans a deployment location, the operator may perform calculations of path loss (assuming the presence of blockages such as buildings and penetration loss due to blockages such as buildings) and may seek to place network nodes in such a way that the network nodes' coverage area achieves a satisfactory coverage, such as in terms of signal level (for example, SNR, SINR) throughout the coverage area.

As time passes, the placement and/or configuration of blockages may change. For example, an urban landscape may change as buildings, street furniture, or other obstructions are built or moved. This may lead to degradation of coverage of the wireless communication network. These coverage issues may be particularly relevant in dense networks, which may become prevalent with progress toward next-generation RATs such as 5G NR and 6G. For example, next-generation RATs may provide for an increased number and density of network nodes, involving the deployment of network nodes (for example, gNBs) not only on towers, but also at the street level. Therefore, coverage may be more prone to landscape changes that obstruct the signal relative to previous RATs such as 3G and 4G. It may be difficult for an operator or network node to identify changes in coverage. For example, manual detection of coverage changes may involve deploying a network engineer to perform testing on location. As another example, a UE undergoing radio link failure, such as due to a blockage, may report a cause for the failure, but the cause may not indicate that the failure is due to a change in LOS conditions. Thus, changing blockages may lead to degraded network performance and may be difficult and costly to detect.

Various aspects relate generally to reporting of LOS status. Some aspects more specifically relate to detecting whether a UE is associated with a LOS status. In some examples, the UE reports location information indicating a location of the UE with the reporting of whether the UE is associated with the LOS status. In some examples a network node determines the location information. In some examples, the UE detects whether the UE is associated with the LOS status based on one or more configured thresholds. In some examples, the detection of whether the UE is associated with the LOS status is based on channel estimation at the UE.

Particular aspects of the subject matter described in this disclosure can be implemented to realize one or more of the following potential advantages. By reporting whether a UE is associated with an LOS status, the UE enables a network node, operator, or core network to track occurrences of NLOS conditions, enabling reconfiguration of the wireless communication network to reduce such occurrences. By reporting the UE's location, the UE simplifies identification of locations associated with NLOS conditions, reducing processor usage and data integration overhead at the network. By determining the UE's location, the network node reduces overhead associated with LOS status reporting and enables determination of locations associated with LOS statuses even if a UE does not opt into location information sharing. Detecting the LOS status based on one or more configured thresholds, and/or based on channel estimation of the UE, enables the UE to detect the LOS status using routine channel estimation results, conserving resources of the UE relative to more sophisticated LOS detection techniques that may require additional measurements at the UE.

Figure 5:
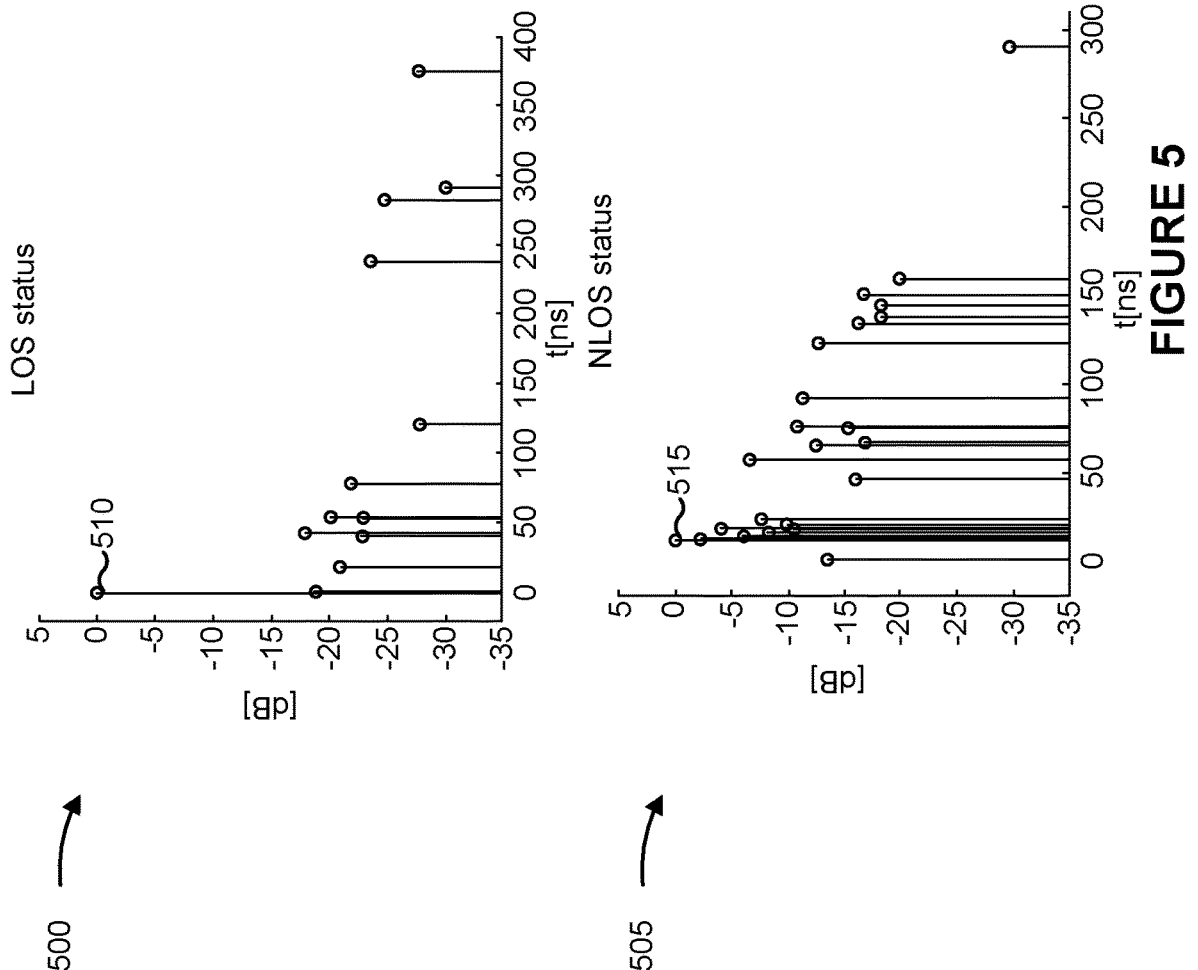
FIG. 5 is a diagram illustrating examples of power delay profiles (PDPs) of an LOS channel and an NLOS channel in accordance with the present disclosure.

FIG. 5 is a diagram illustrating examples 500 and 505 of power delay profiles (PDPs) of an LOS channel and an NLOS channel in accordance with the present disclosure. A PDP indicates an intensity [dB] of a transmitted signal (as received through a multipath channel) as a function of time delay (t, represented in nanoseconds (ns)). The intensity may also be referred to as a signal strength. The PDPs of FIG. 5 depict a number of taps, where each tap is represented by a circle indicating an intensity at which the signal is received at a receiver (for example, a UE) and a corresponding line indicating a time at which the signal is received at the receiver. Different received instances of the transmitted signal are received with different signal strengths and at different times due to having propagated via different paths of the multipath channel. For example, the received signal strength of an instance of the transmitted signal may be related to a length of a propagation path of the instance and any interactions of the signal with reflectors or other objects.

Example 500 shows a PDP for an LOS channel, in which the UE has an LOS status with regard to a transmitter of a signal. In example 500, the PDP has one tap 510 that has a significantly greater intensity than any other tap of the PDP (for example, as represented by a difference between an intensity of the tap 510 being greater than an intensity of a next-strongest tap by at least a threshold). The tap 510 may represent an instance of the signal received directly via an LOS path. As shown, the tap 510 has an intensity that is greater than an intensity of the next-strongest tap by approximately 18 dB. In the LOS channel, an expected value of the tap 510 not equal to zero and is significantly greater than a standard deviation of the tap 510, as shown in Formula 1:

$$LOS_{tap} \sim CN(\mu, \sigma^2), \text{ where } \mu \gg \sigma$$

In Formula 1, "CN" represents a complex normal distribution of the expected value y and the variance $\sigma^2$ (which is the square of the standard deviation a) of the tap 510.

Example 505 shows a PDP for an NLOS channel, in which the UE does not have an LOS status with regard to the transmitter. As shown, a strongest tap 515 is not separated from a next-strongest tap by a threshold intensity. This may be because all paths of received instances of the signal are NLOS paths, leading to a situation in which there is not a dominant tap because there is no direct LOS path between the UE and the transmitter.

Aspects of the present disclosure relate to determination of whether the UE is associated with an LOS status or an NLOS status. The UE may determine whether the UE is associated with the LOS status or the NLOS status. For example, the UE may determine whether the UE is associated with the LOS status or the NLOS status by comparing a received intensity of a strongest tap (such as tap 510 or tap 515) and a received intensity of one or more taps other than the next-strongest tap. For example, the UE may determine whether the received intensity of the strongest tap is greater than the received intensity of any other tap by at least a first threshold amount, as shown in Formula 2:

$$\max(taps) - taps_i > TH1 = 10[dB] \forall i, i \neq \operatorname{argmax}_i(taps)$$

In Formula 2, "taps" represents all taps received by a UE, $taps_i$ represents a given tap (where i is not the strongest tap, as noted by "i≠argmax$_i$(taps)), and TH1 is the first threshold (configured to 10 dB in this example). "∀i" means "for all values of i" (that is, the universal quantification). The first threshold may be configurable. In some aspects, the UE may use a channel estimation result to determine received intensity of the taps. For example, the UE may perform channel estimation of the multipath channel (thus referred to as an estimated channel), such as in each slot. The UE may determine intensity of the taps and/or time values of the taps via the channel estimation. Thus, the UE may identify a strongest tap and/or an LOS status using channel estimation, which may already be performed in typical operation.

In some aspects, the UE may determine whether the UE is associated with the LOS status or the NLOS status according to a statistical value of the strongest tap. For example, as noted, the strongest tap (such as tap 510 or tap 515) may be associated with an expected value y that is significantly greater than a standard deviation of the strongest tap. In some aspects, the UE may determine whether the UE is associated with the LOS status or the NLOS status using a second threshold relating to an expected value of the strongest tap and a standard deviation of the strongest tap.

For example, the UE may determine whether the UE is associated with the LOS status using Formula 3:

$$\frac{\mu(\text{most powerful tap})}{\sigma(\text{most powerful tap})} > TH2 = 10[dB]$$

In Formula 3, the second threshold TH2 is 10 dB, and may be configurable. In some aspects, the UE may determine the expected value and/or the standard deviation based on channel estimation in one or more slots. For example, the UE may determine the expected value and/or the standard deviation using channel estimation results in a number of slots, such as a number of slots within a time window or a number of previous slots. Thus, the UE may improve accuracy of the statistics (such as expected value and/or standard deviation) used to determine whether the UE is associated with the LOS status.

In some aspects, the UE may determine whether the UE is associated with the LOS status based on the first threshold and the second threshold. For example, the UE may determine that the UE is associated with the LOS status only if both Formula 2 and Formula 3 are satisfied. In some aspects, the UE may determine whether the UE is associated with the LOS status based on only one of the first threshold or the second threshold. For example, the UE may determine that the UE is associated with the LOS status if Formula 2 is satisfied. As another example, the UE may determine that the UE is associated with the LOS status if Formula 3 is satisfied. The UE may transmit a report indicating whether the UE is associated with an LOS status (or indicating whether the UE is associated with the LOS status or an NLOS status), as described in connection with FIG. 6.

Figure 6:
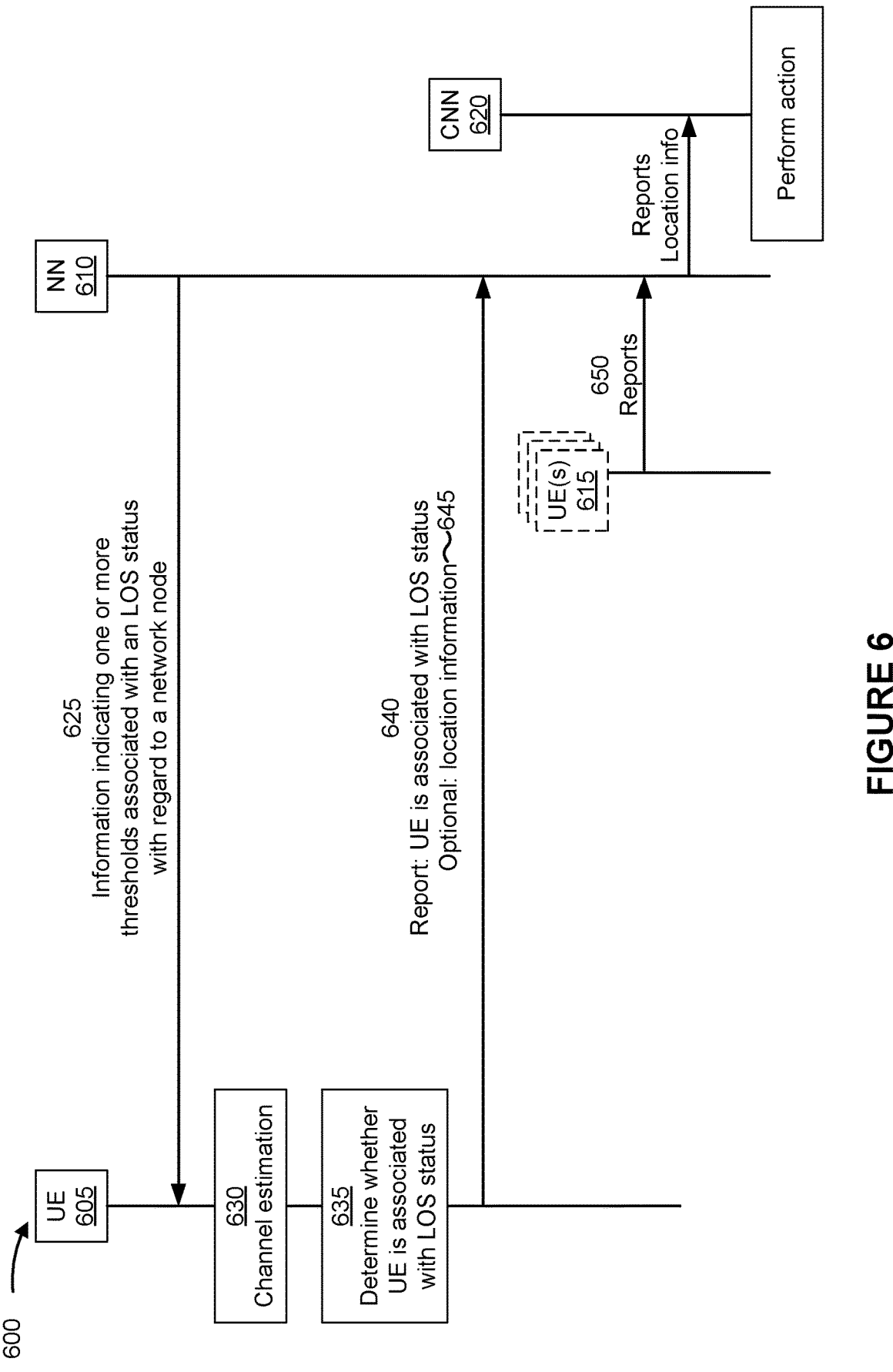
FIG. 6 is a diagram illustrating an example of signaling for reporting of an LOS status in accordance with the present disclosure.

FIG. 6 is a diagram illustrating an example 600 of signaling for reporting of an LOS status in accordance with the present disclosure. Example 600 includes a UE 605 (such as UE 120) and a network node 610 (such as network node 110). A group of UEs 615 (such as UE 120) are also illustrated to facilitate description of the network node 610 (or a core network device) gathering reporting of LOS statuses from a number of UEs. Furthermore, FIG. 6 illustrates a core network node 620, which may include any device, entity, or function of a core network (such as a 5G core or another type of core network).

As shown in FIG. 6, and by reference number 625, the UE 605 may receive (such as from the network node 610) information indicating one or more thresholds associated with an LOS status with regard to a network node (such as the network node 610 or another network node). The one or more thresholds may include one or more of: a first threshold (described as TH1 in connection with FIG. 5) for a difference between a strongest tap of an estimated channel and a second-strongest tap of the estimated channel, or a second threshold (described as TH2 in connection with FIG. 5) relating to an expected value of the strongest tap and a standard deviation of the strongest tap. The information indicating the one or more thresholds may include any form of signaling, such as RRC signaling, medium access control signaling, or another form of signaling. In some aspects, the information indicating the one or more thresholds may be based on or otherwise associated with capability signaling. For example, the UE 605 may transmit capability signaling indicating one or more capabilities for reporting LOS statuses, such as a capability indicating whether the UE supports LOS status reporting. In some aspects, the information indicating the one or more thresholds may comprise configuration information such as radio resource control (RRC) signaling. In some aspects, the network node 610 may transmit dynamic signaling, such as medium access control signaling or downlink control information, activating a selected set of thresholds. For example, the configuration information may indicate multiple thresholds, and the dynamic signaling may indicate a set of thresholds selected from the multiple thresholds.

As shown in FIG. 6, the UE 605 may perform channel estimation 630 of a channel (referred to as an estimated channel), as described with regard to FIG. 5. In an operation 635, the UE 605 may determine whether the UE 605 is associated with an LOS status. For example, the UE 605 may determine whether the UE 605 is associated with an LOS status or an NLOS status, as described in connection with FIG. 5. In some aspects, a UE 605 that is not associated with an LOS status may be implicitly associated with an NLOS status. For example, the UE 605 may report whether or not the UE 605 is associated with an LOS status, and if the reporting indicates that the UE 605 is not associated with the LOS status, it may be understood that the UE 605 is associated with the NLOS status.

As shown, the UE 605 may transmit a report 640 of whether the UE 605 is associated with the LOS status. The network node 610 may receive the report 640. In some aspects, the report 640 may indicate whether the UE 605 is associated with the LOS status with regard to the network node 610. For example, the UE 605 may report, to the network node 610, whether the UE 605 has an LOS path to the network node 610. In some aspects, the report 640 may identify a network node to which the report 640 relates. For example, the report 640 may include an identifier of the network node to which the report 640 relates (that is, a network node for which the report 640 indicates whether the UE 605 is associated with an LOS status). In some aspects, the report 640 may relate to a serving cell of the UE 605. For example, the report 640 may indicate whether the UE 605 is associated with an LOS status with regard to a network node (such as the network node 610 or another network node) that provides a serving cell of the UE 605. The UE 605 may transmit the report 640 via any suitable form of signaling, such as a physical uplink control channel (PUCCH) (such as a physical level PUCCH)

In some aspects, the report 640 may include location information 645. The location information 645 may include information indicating a location of the UE 605, such as coordinates of the UE 605, a geographical region of the UE 605, one or more parameters indicating the location of the UE 605 relative to the network node 610 to which the report 640 relates, or another form of location information. In some aspects, the report 640 may include location information 645 based on the UE 605 being associated with a consent status. For example, the report 640 may include the location information 645 if the UE 605 has provided user consent for the provision of location information. In some aspects, the UE 605 may identify the location using a global navigation satellite system (GNSS).

In some aspects, the report 640 may omit the location information 645 (that is, the UE 605 may not send the location information 645 over the uplink). For example, the network node 610 (or the core network node 620) may obtain the location of the UE 605. In this example, the location of the UE 605 may be determined using a network location technique, such as cellular tower triangulation (in which location data from a number of cellular towers or network nodes are combined to identify the location), a round trip time of a signal, or another form of location determination. In some aspects, the UE 605, the network node 610, or a core network node 620 may identify the location in association with a wireless local area network, such as based on a WiFi technique. For example, a UE 605 that has WiFi enabled may communicate with nearby Wi-Fi networks even if not connected to the WiFi network. The UE 605 may automatically scan Wi-Fi access points, and may note signal strength of the Wi-Fi access points. A Wi-Fi provider may record the location of the UE 605 when the UE 605 is in range of a Wi-Fi network associated with the Wi-Fi provider. The UE 605, the network node 610, or the core network node 620 may obtain the location from the Wi-Fi provider.

As shown, in some aspects, the network node 610 may obtain reports 650 from the group of UEs 615. For example, the network node 610 may obtain reports 650 indicating LOS statuses and locations of the group of UEs 615. In some aspects, the network node 610 may obtain these reports 640/650 from all UEs 605/615 connected to the network node 610. In some aspects, the network node 610 may obtain these reports 640/650 from UEs 605/615 that are associated with an NLOS status. For example, a UE 605/615 may transmit a report 640/650 only if the UE 605/615 is associated with an NLOS status.

As shown, in some aspects, the network node 610 may provide the reports 640 and/or 650, or information associated with the reports 640 and/or 650 (such as location information 645 associated with the reports 640 and/or 650), to the core network node 620. For example, the network node 610 may transmit, to the core network node 620, the reports 640 and/or 650, and the location information (such as location information 645) associated with the reports 640 and/or 650. In some aspects, the core network node 620 may identify an obstruction according to the reports 640 and/or 650. For example, the core network node 620 (or an operator associated with the core network node 620) may identify that a threshold number of NLOS statuses are reported for a given location or area that is expected to be associated with an LOS status. If the threshold number of NLOS statuses are reported for the given location or area, the core network node 620 may perform an action or cause an action to be performed. The action may include, for example, deploying an entity (such as an engineer) to the site, changing an antenna orientation of a network node 610 that covers the given location or area, relocating a network node 610 in association with the given location or area, requesting that a blockage in the given location or area be removed, or another action.

In some aspects, the core network node 620 may store information relating to multiple configurations of the network node 610. For example, the core network node 620 may store information indicating LOS statuses for a first configuration (such as a first antenna configuration which may include a first antenna tilt) of the network node 610, and information indicating LOS statuses for a second configuration (such as a second antenna configuration which may include a second antenna tilt) of the network node 610. When performing the action or causing the action to be performed, the core network node 620 may select the action based on the stored information. For example, the core network node 620 may select an antenna configuration from available antenna configurations based on LOS statuses associated with the available antenna configurations. In this example, the core network node 620 may select an antenna configuration that is expected to provide a highest number of LOS statuses (as opposed to NLOS statuses) for the location.

Figure 7:
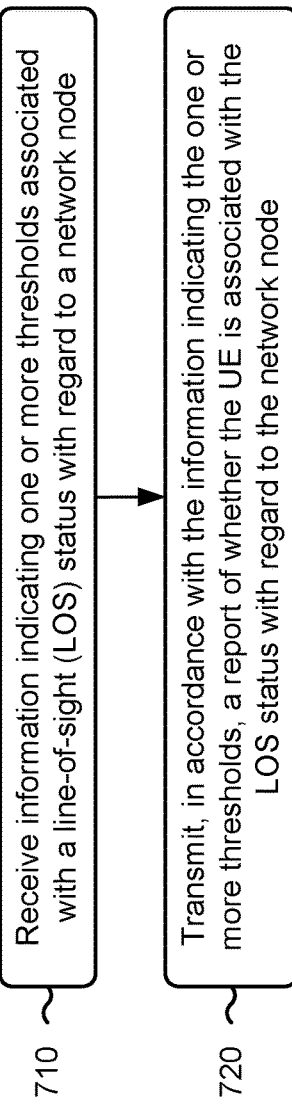
FIG. 7 is a flowchart illustrating an example process performed, for example, at a UE or an apparatus of a UE that supports LOS status reporting in accordance with the present disclosure.

FIG. 7 is a flowchart illustrating an example process 700 performed, for example, at a UE or an apparatus of a UE that supports LOS status reporting in accordance with the present disclosure. Example process 700 is an example where the apparatus or the UE (for example, UE 120) performs operations associated with LOS status indication.

As shown in FIG. 7, in some aspects, process 700 may include receiving information indicating one or more thresholds associated with a LOS status with regard to a network node (block 710). For example, the UE (such as by using communication manager 140 or reception component 902, depicted in FIG. 9) may receive information indicating one or more thresholds associated with an LOS status with regard to a network node, as described above.

As further shown in FIG. 7, in some aspects, process 700 may include transmitting, in accordance with the information indicating the one or more thresholds, a report of whether the UE is associated with the LOS status with regard to the network node (block 720). For example, the UE (such as by using communication manager 140 or transmission component 904, depicted in FIG. 9) may transmit, in accordance with the information indicating the one or more thresholds, a report of whether the UE is associated with the LOS status with regard to the network node, as described above.

Process 700 may include additional aspects, such as any single aspect or any combination of aspects described below or in connection with one or more other processes described elsewhere herein.

In a first additional aspect, the report includes location information indicating a location of the UE.

In a second additional aspect, alone or in combination with the first aspect, the report includes the location information based at least in part on the UE being associated with a consent to sharing the location information.

In a third additional aspect, alone or in combination with one or more of the first and second aspects, the one or more thresholds include at least one of a first threshold for a difference between a strongest tap of an estimated channel and a second-strongest tap of the estimated channel, or a second threshold relating to an expected value of the strongest tap and a standard deviation of the strongest tap.

In a fourth additional aspect, alone or in combination with one or more of the first through third aspects, process 700 includes transmitting the report based at least in part on the channel estimation.

In a fifth additional aspect, alone or in combination with one or more of the first through fourth aspects, the channel estimation is further based at least in part on one or more previous channel estimation operations.

In a sixth additional aspect, alone or in combination with one or more of the first through fifth aspects, the LOS status indicates whether the UE is within an LOS of the network node.

Although FIG. 7 shows example blocks of process 700, in some aspects, process 700 may include additional blocks, fewer blocks, different blocks, or differently arranged blocks than those depicted in FIG. 7. Additionally or alternatively, two or more of the blocks of process 700 may be performed in parallel.

FIG. 8 is a flowchart illustrating an example process 800 performed, for example, at a network node or an apparatus of the network node that supports LOS status reporting in accordance with the present disclosure. Example process 800 is an example where the network node (for example, network node 110) performs operations associated with LOS status indication.

As shown in FIG. 8, in some aspects, process 800 may include transmitting information indicating one or more thresholds associated with an LOS status with regard to a UE (block 810). For example, the network node (such as by using communication manager 150 or transmission component 1004, depicted in FIG. 10) may transmit information indicating one or more thresholds associated with an LOS status with regard to a UE, as described above.

As further shown in FIG. 8, in some aspects, process 800 may include receiving, in accordance with the information indicating the one or more thresholds, a report of whether the UE is associated with the LOS status with regard to the network node (block 820). For example, the network node (such as by using communication manager 150 or reception component 1002, depicted in FIG. 10) may receive, in accordance with the information indicating the one or more thresholds, a report of whether the UE is associated with the LOS status with regard to the network node, as described above. The network node may receive the report in accordance with the information indicating the one or more thresholds. For example, the one or more thresholds may be used by the UE to determine the LOS status, and the report may indicate the LOS status. Thus, the report is received in accordance with the information.

As further shown in FIG. 8, in some aspects, process 800 may include providing the report or information associated with the report (block 830). For example, the network node (such as by using communication manager 150 or transmission component 1004, depicted in FIG. 10) may provide the report or information associated with the report, as described above.

Process 800 may include additional aspects, such as any single aspect or any combination of aspects described below or in connection with one or more other processes described elsewhere herein.

In a first additional aspect, process 800 includes obtaining, in association with the report, location information associated with the UE.

In a second additional aspect, alone or in combination with the first aspect, the report includes the location information.

In a third additional aspect, alone or in combination with one or more of the first and second aspects, obtaining the location information further comprises obtaining the location information in association with a wireless local area network.

In a fourth additional aspect, alone or in combination with one or more of the first through third aspects, obtaining the location information further comprises obtaining the location information using a network location technique.

In a fifth additional aspect, alone or in combination with one or more of the first through fourth aspects, the one or more thresholds include at least one of a first threshold for a difference between a strongest tap of an estimated channel and a second-strongest tap of the estimated channel, or a second threshold relating to an expected value of the strongest tap and a standard deviation of the strongest tap.

In a sixth additional aspect, alone or in combination with one or more of the first through fifth aspects, the LOS status indicates whether a given UE is within an LOS of the network node.

Although FIG. 8 shows example blocks of process 800, in some aspects, process 800 may include additional blocks, fewer blocks, different blocks, or differently arranged blocks than those depicted in FIG. 8. Additionally or alternatively, two or more of the blocks of process 800 may be performed in parallel.

Figure 9:
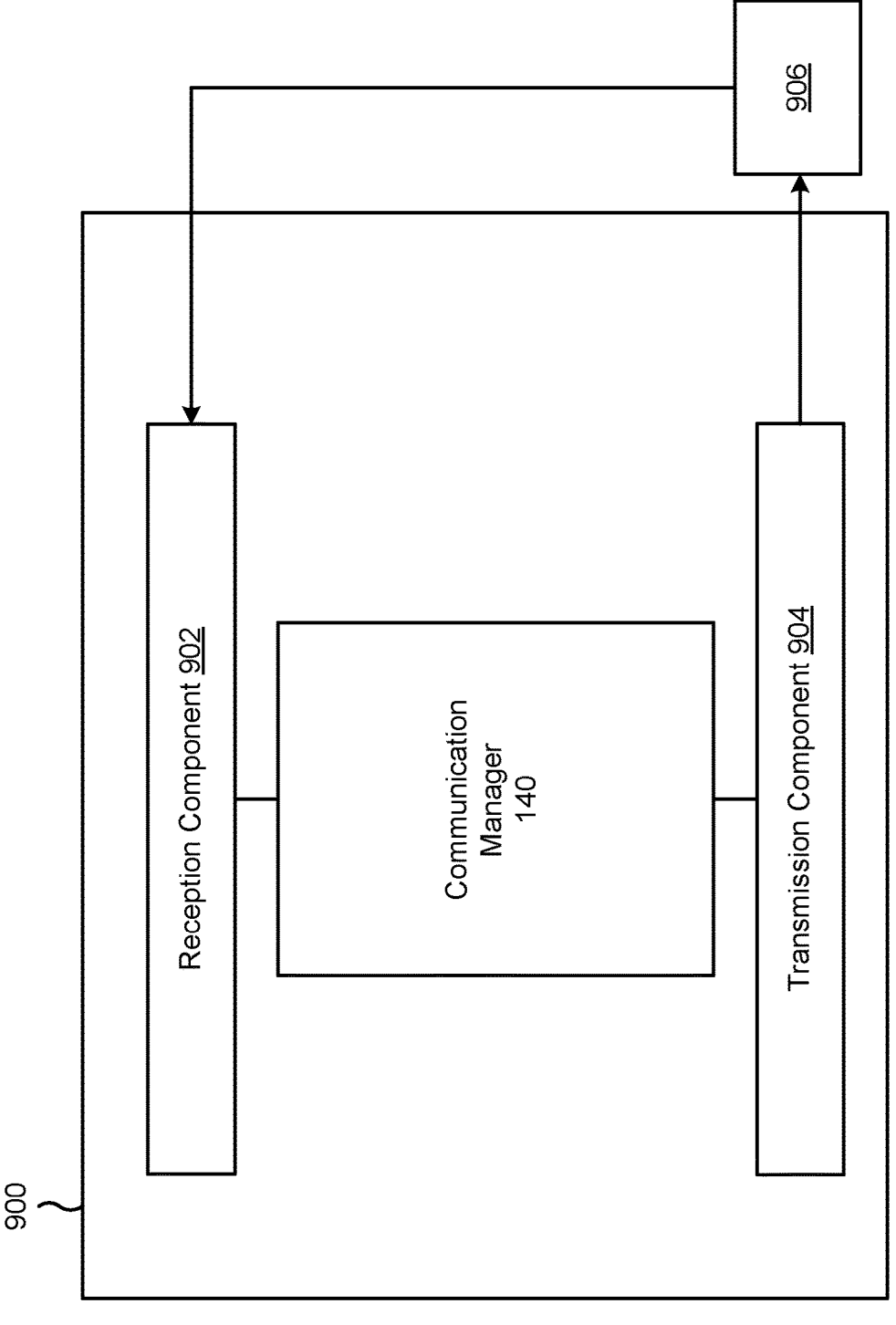
FIG. 9 is a diagram of an example apparatus for wireless communication that supports LOS status reporting in accordance with the present disclosure.

FIG. 9 is a diagram of an example apparatus 900 for wireless communication that supports LOS status reporting in accordance with the present disclosure. The apparatus 900 may be a UE, or a UE may include the apparatus 900. In some aspects, the apparatus 900 includes a reception component 902, a transmission component 904, and a communication manager 140, which may be in communication with one another (for example, via one or more buses). As shown, the apparatus 900 may communicate with another apparatus 906 (such as a UE, a network node, or another wireless communication device) using the reception component 902 and the transmission component 904.

In some aspects, the apparatus 900 may be configured to and/or operable to perform one or more operations described herein in connection with FIGS. 4, 5, and 6. Additionally or alternatively, the apparatus 900 may be configured to and/or operable to perform one or more processes described herein, such as process 700 of FIG. 7. In some aspects, the apparatus 900 may include one or more components of the UE described above in connection with FIG. 2.

The reception component 902 may receive communications, such as reference signals, control information, and/or data communications, from the apparatus 906. The reception component 902 may provide received communications to one or more other components of the apparatus 900, such as the communication manager 140. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, a modem, a demodulator, a MIMO detector, a receive processor, a controller/processor, and/or a memory of the UE described above in connection with FIG. 2.

The transmission component 904 may transmit communications, such as reference signals, control information, and/or data communications, to the apparatus 906. In some aspects, the communication manager 140 may generate communications and may transmit the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, and/or a memory of the UE described above in connection with FIG. 2. In some aspects, the transmission component 904 may be co-located with the reception component 902 in one or more transceivers.

The communication manager 140 may receive or may cause the reception component 902 to receive information indicating one or more thresholds associated with a LOS status with regard to a network node. The communication manager 140 may transmit or may cause the transmission component 904 to transmit, in accordance with the information indicating the one or more thresholds, a report of whether the UE is associated with the LOS status with regard to the network node. In some aspects, the communication manager 140 may perform one or more operations described elsewhere herein as being performed by one or more components of the communication manager 140.

The communication manager 140 may include one or more controller/processors and one or more memories of the UE described above in connection with FIG. 2. Alternatively, the set of components may be separate and distinct from the communication manager 140. In some aspects, one or more components of the set of components may include or may be implemented within one or more controller/processors and/or one or more memories of the UE described above in connection with FIG. 2. Additionally or alternatively, one or more components of the set of components may be implemented at least in part as software stored in one or more memories. For example, a component (or a portion of a component) may be implemented as instructions or code stored in a non-transitory computer-readable medium and executable by a controller or a processor to perform the functions or operations of the component.

The reception component 902 may receive information indicating one or more thresholds associated with an LOS status with regard to a network node. The transmission component 904 may transmit, in accordance with the information indicating the one or more thresholds, a report of whether the UE is associated with the LOS status with regard to the network node.

The transmission component 904 may transmit the report based at least in part on channel estimation.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

Figure 10:
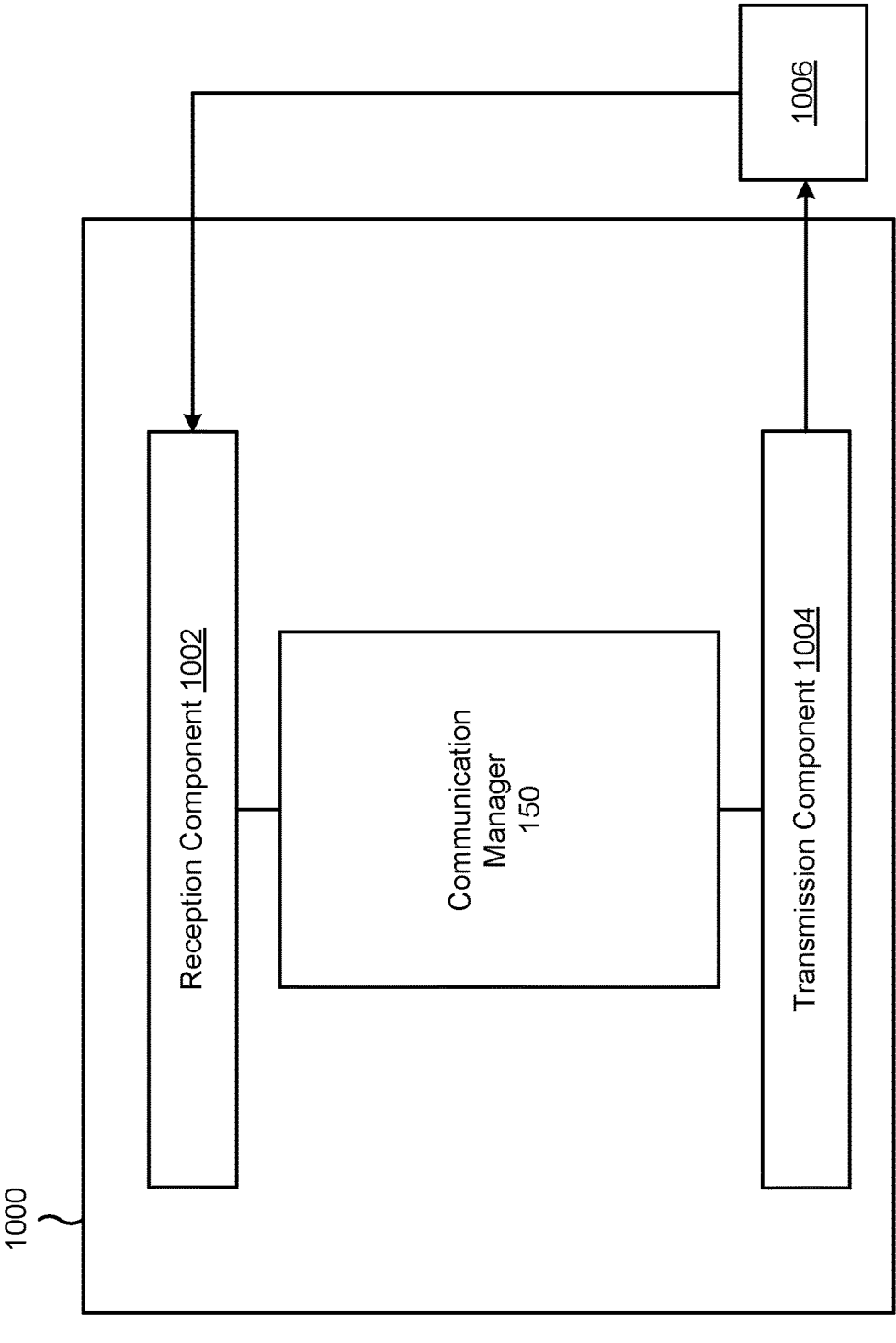
FIG. 10 is a diagram of an example apparatus for wireless communication that supports LOS status indication in accordance with the present disclosure.

FIG. 10 is a diagram of an example apparatus 1000 for wireless communication that supports LOS status indication in accordance with the present disclosure. The apparatus 1000 may be a network node, or a network node may include the apparatus 1000. In some aspects, the apparatus 1000 includes a reception component 1002, a transmission component 1004, and a communication manager 150, which may be in communication with one another (for example, via one or more buses). As shown, the apparatus 1000 may communicate with another apparatus 1006 (such as a UE, a network node, or another wireless communication device) using the reception component 1002 and the transmission component 1004.

In some aspects, the apparatus 1000 may be configured to and/or operable to perform one or more operations described herein in connection with FIGS. 4-6. Additionally or alternatively, the apparatus 1000 may be configured to and/or operable to perform one or more processes described herein, such as process 800 of FIG. 8. In some aspects, the apparatus 1000 may include one or more components of the network node described above in connection with FIG. 2.

The reception component 1002 may receive communications, such as reference signals, control information, and/or data communications, from the apparatus 1006. The reception component 1002 may provide received communications to one or more other components of the apparatus 1000, such as the communication manager 150. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1002 may include one or more antennas, a modem, a demodulator, a MIMO detector, a receive processor, one or more controller/processors, and/or one or more memories of the network node described above in connection with FIG. 2.

The transmission component 1004 may transmit communications, such as reference signals, control information, and/or data communications, to the apparatus 1006. In some aspects, the communication manager 150 may generate communications and may transmit the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, one or more controller/processors, and/or one or more memories of the network node described above in connection with FIG. 2. In some aspects, the transmission component 1004 may be co-located with the reception component 1002 in one or more transceivers.

The communication manager 150 may transmit or may cause the transmission component 1004 to transmit information indicating one or more thresholds associated with an LOS status with regard to a UE. The communication manager 150 may receive or may cause the reception component 1002 to receive, in accordance with the information indicating the one or more thresholds, a report of whether the UE is associated with the LOS status with regard to the network node. The communication manager 150 may provide the report or information associated with the report. In some aspects, the communication manager 150 may perform one or more operations described elsewhere herein as being performed by one or more components of the communication manager 150.

The communication manager 150 may include one or more controller/processors, one or more memories, a scheduler, and/or a communication unit of the network node described above in connection with FIG. 2. Alternatively, the set of components may be separate and distinct from the communication manager 150. In some aspects, one or more components of the set of components may include or may be implemented within one or more controller/processors, one or more memories, a scheduler, and/or a communication unit of the network node described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by one or more controllers or one or more processors to perform the functions or operations of the component.

The transmission component 1004 may transmit information indicating one or more thresholds associated with an LOS status with regard to a UE. The reception component 1002 may receive, in accordance with the information indicating the one or more thresholds, a report of whether the UE is associated with the LOS status with regard to the network node. The transmission component 1004 may provide the report or information associated with the report.

The reception component 1002 may obtain, in association with the report, location information associated with the UE.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving information indicating one or more thresholds associated with a line-of-sight (LOS) status with regard to a network node; and transmitting, in accordance with the information indicating the one or more thresholds, a report of whether the UE is associated with the LOS status with regard to the network node.

Aspect 2: The method of Aspect 1, wherein the report includes location information indicating a location of the UE.

Aspect 3: The method of Aspect 2, wherein the report includes the location information based at least in part on the UE being associated with a consent to sharing the location information.

Aspect 4: The method of any of Aspects 1-3, wherein the one or more thresholds include at least one of: a first threshold for a difference between a strongest tap of an estimated channel and a second-strongest tap of the estimated channel, or a second threshold relating to an expected value of the strongest tap and a standard deviation of the strongest tap.

Aspect 5: The method of any of Aspects 1-4, further comprising performing channel estimation of an estimated channel, wherein transmitting the report further comprises transmitting the report based at least in part on the channel estimation.

Aspect 6: The method of Aspect 5, wherein the channel estimation is further based at least in part on one or more previous channel estimation operations.

Aspect 7: The method of any of Aspects 1-6, wherein the LOS status indicates whether the UE is within an LOS of the network node.

Aspect 8: A method of wireless communication performed by a network node, comprising: transmitting information indicating one or more thresholds associated with a line-of-sight (LOS) status with regard to a user equipment (UE); receiving, in accordance with the information indicating the one or more thresholds, a report of whether the UE is associated with the LOS status with regard to the network node; and providing the report or information associated with the report.

Aspect 9: The method of Aspect 8, further comprising obtaining, in association with the report, location information associated with the UE.

Aspect 10: The method of Aspect 9, wherein the report includes the location information.

Aspect 11: The method of Aspect 9, wherein obtaining the location information further comprises obtaining the location information in association with a wireless local area network.

Aspect 12: The method of Aspect 9, wherein obtaining the location information further comprises obtaining the location information using a network location technique.

Aspect 13: The method of any of Aspects 8-12, wherein the one or more thresholds include at least one of: a first threshold for a difference between a strongest tap of an estimated channel and a second-strongest tap of the estimated channel, or a second threshold relating to an expected value of the strongest tap and a standard deviation of the strongest tap.

Aspect 14: The method of any of Aspects 8-13, wherein the LOS status indicates whether a given UE is within an LOS of the network node.

Aspect 15: An apparatus for wireless communication at a device, comprising one or more processors; one or more memories coupled with the one or more processors; and instructions stored in the one or more memories and executable by the one or more processors to cause the apparatus to perform the method of one or more of Aspects 1-14.

Aspect 16: An apparatus for wireless communication at a device, the apparatus comprising one or more memories and one or more processors coupled to the one or more memories, the one or more processors configured to cause the device to perform the method of one or more of Aspects 1-14.

Aspect 17: An apparatus for wireless communication, comprising at least one means for performing the method of one or more of Aspects 1-14.

Aspect 18: A non-transitory computer-readable medium storing code for wireless communication, the code comprising instructions executable by one or more processors to perform the method of one or more of Aspects 1-14.

Aspect 19: A non-transitory computer-readable medium storing a set of instructions for wireless communication, the set of instructions comprising one or more instructions that, when executed by one or more processors of a device, cause the device to perform the method of one or more of Aspects 1-14.

Aspect 20: A device for wireless communicating comprising a processing system that includes one or more processors and one or more memories coupled with the one or more processors, the processing system configured to cause the device to perform the method of one or more of Aspects 1-14.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and at least one of software or firmware. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based on or otherwise in association with" unless explicitly stated otherwise. Also, as used herein, the term "or" is intended to be inclusive when used in a series and may be used interchangeably with "and/or," unless explicitly stated otherwise (for example, if used in combination with "either" or "only one of"). It should be understood that "one or more" is equivalent to "at least one."

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set.

What is claimed is:
1. A user equipment (UE) for wireless communication, comprising:
one or more antennas; and
a processing system that includes one or more processors and one or more memories that store code and are coupled with the one or more processors, the processing system configured to cause the UE to:

receive information indicating one or more thresholds associated with a line-of-sight (LOS) status with regard to a network node, wherein the one or more thresholds include at least one of:

a first threshold for a difference between a strongest tap of an estimated channel and a second-strongest tap of the estimated channel, or a second threshold relating to an expected value of the strongest tap and a standard deviation of the strongest tap; and transmit, in accordance with the information indicating the one or more thresholds, a report of whether the UE is associated with the LOS status with regard to the network node.

2. The UE of claim 1, wherein the report includes location information indicating a location of the UE.

3. The UE of claim 2, wherein the report includes the location information based at least in part on the UE being associated with a consent to share the location information.

4. The UE of claim 1, wherein the processing system is further configured to cause the UE to perform channel estimation of an estimated channel, wherein the processing system, to cause the UE to transmit the report, is configured to cause the UE to transmit the report based at least in part on the channel estimation.

5. The UE of claim 4, wherein the channel estimation is further based at least in part on one or more previous channel estimation operations.

6. The UE of claim 1, wherein the LOS status indicates whether the UE is within an LOS of the network node.

7. The UE of claim 1, wherein the processing system, to transmit the report, is configured to cause the UE to:

transmit the report only if the UE is associated with a non-LOS (NLOS) status.

8. A network node for wireless communication, comprising:

one or more antennas; and a processing system that includes one or more processors and one or more memories that store code and are coupled with the one or more processors, the processing system configured to cause the network node to:

transmit information indicating one or more thresholds associated with a line-of-sight (LOS) status with regard to a user equipment (UE), wherein the one or more thresholds include at least one of:

a first threshold for a difference between a strongest tap of an estimated channel and a second-strongest tap of the estimated channel, or a second threshold relating to an expected value of the strongest tap and a standard deviation of the strongest tap;

receive, in accordance with the information indicating the one or more thresholds, a report of whether the UE is associated with the LOS status with regard to the network node; and provide the report or information associated with the report.

9. The network node of claim 8, wherein the processing system is configured to cause the network node to obtain, in association with the report, location information associated with the UE.

10. The network node of claim 9, wherein the report includes the location information.

11. The network node of claim 9, wherein, to cause the network node to obtain the location information, the processing system is configured to cause the network node to obtain the location information in association with a wireless local area network.

12. The network node of claim 9, wherein, to cause the network node to obtain the location information, the processing system is configured to cause the network node to obtain the location information using a network location technique.

13. The network node of claim 8, wherein the LOS status indicates whether a given UE is within an LOS of the network node.

14. The network node of claim 8, wherein the processing system is configured to cause the network node to:

receive, from another UE, another report of whether the other UE is associated with the LOS status with regard to the network node.

15. A method of wireless communication performed at a user equipment (UE), comprising:

receiving information indicating one or more thresholds associated with a line-of-sight (LOS) status with regard to a network node, wherein the one or more thresholds include at least one of:

a first threshold for a difference between a strongest tap of an estimated channel and a second-strongest tap of the estimated channel, or a second threshold relating to an expected value of the strongest tap and a standard deviation of the strongest tap; and transmitting, in accordance with the information indicating the one or more thresholds, a report of whether the UE is associated with the LOS status with regard to the network node.

16. The method of claim 15, wherein the report includes location information indicating a location of the UE.

17. The method of claim 16, wherein the report includes the location information based at least in part on the UE being associated with a consent to share the location information.

18. The method of claim 15, further comprising performing channel estimation of an estimated channel, wherein transmitting the report further comprises transmitting the report based at least in part on the channel estimation.

19. The method of claim 18, wherein the channel estimation is further based at least in part on one or more previous channel estimation operations.

20. The method of claim 15, wherein the LOS status indicates whether the UE is within an LOS of the network node.

21. The method of claim 15, wherein transmitting the report comprises:

transmitting the report only if the UE is associated with a non-LOS (NLOS) status.

22. A method of wireless communication performed at a network node, comprising:

transmitting information indicating one or more thresholds associated with a line-of-sight (LOS) status with regard to a user equipment (UE), wherein the one or more thresholds include at least one of:

a first threshold for a difference between a strongest tap of an estimated channel and a second-strongest tap of the estimated channel, or a second threshold relating to an expected value of the strongest tap and a standard deviation of the strongest tap;

receiving, in accordance with the information indicating the one or more thresholds, a report of whether the UE is associated with the LOS status with regard to the network node; and providing the report or information associated with the report.

23. The method of claim 22, further comprising obtaining, in association with the report, location information associated with the UE.

24. The method of claim 23, wherein the report includes the location information.

25. The method of claim 23, wherein obtaining the location information further comprises obtaining the location information in association with a wireless local area network.

26. The method of claim 23, wherein obtaining the location information further comprises obtaining the location information using a network location technique.

27. The method of claim 22, wherein the LOS status indicates whether a given UE is within an LOS of the network node.

28. The method of claim 22, further comprising:

receiving, from another UE, another report of whether the other UE is associated with the LOS status with regard to the network node.

\* \* \* \* \*